(12) United States Patent
Hadjadj et al.

(10) Patent No.: US 12,263,404 B2
(45) Date of Patent: Apr. 1, 2025

(54) METHOD AND APPARATUS FOR ENHANCED GRAPHICS RENDERING IN A VIDEO GAME ENVIRONMENT

(71) Applicant: TAKE-TWO INTERACTIVE SOFTWARE, INC., New York, NY (US)

(72) Inventors: Alexandre Hadjadj, Edinburgh (GB); Raymond Kerr, Oceanside, CA (US); Steve Reed, San Diego, CA (US); Tyler Robertson, Carlsbad, CA (US); Owen Shepherd, Edinburgh (GB); Flavius Alecu, Carlsbad, CA (US); Rick Stirling, Edinburgh (GB)

(73) Assignee: TAKE-TWO INTERACTIVE SOFTWARE, INC., New York, NY (US)

( * ) Notice: Subject to any disclaimer, the term of this patent is extended or adjusted under 35 U.S.C. 154(b) by 155 days.

(21) Appl. No.: 18/056,862

(22) Filed: Nov. 18, 2022

(65) Prior Publication Data

US 2023/0141387 A1 May 11, 2023

Related U.S. Application Data

(62) Division of application No. 16/373,514, filed on Apr. 2, 2019, now Pat. No. 11,534,688.

(60) Provisional application No. 62/651,623, filed on Apr. 2, 2018.

(51) Int. Cl.
| | |
|---|---|
| *G06T 15/50* | (2011.01) |
| *A63F 13/52* | (2014.01) |
| *A63F 13/65* | (2014.01) |
| *G06T 15/80* | (2011.01) |
| *G06T 17/20* | (2006.01) |

(52) U.S. Cl.
CPC .............. *A63F 13/52* (2014.09); *A63F 13/65* (2014.09); *G06T 15/80* (2013.01); *G06T 17/20* (2013.01)

(58) Field of Classification Search
None
See application file for complete search history.

(56) References Cited

U.S. PATENT DOCUMENTS

| | | | |
|---|---|---|---|
| 10,186,061 B1 | 1/2019 | Boxer | |
| 2005/0264567 A1 | 12/2005 | Sommers | |
| 2011/0012901 A1* | 1/2011 | Kaplanyan | ............ G06T 15/506 345/426 |
| 2012/0212491 A1* | 8/2012 | Hager | ..................... G06T 15/50 345/426 |

OTHER PUBLICATIONS

"Unreal Engine," Wikipedia, The Free Encyclopedia, Mar. 29, 2018 [retrieved on Aug. 31, 2020]. Retrieved from the Internet: <URL:https://en.wikipedia.org/w/index.php?title+Unreal_Engine&oldid+833042492">, 23 pages.

(Continued)

*Primary Examiner* — Lawrence S Galka
(74) *Attorney, Agent, or Firm* — Orrick, Herrington & Sutcliffe LLP

(57) ABSTRACT

A system and method for improved graphics rendering in a video game environment.

4 Claims, 46 Drawing Sheets
(36 of 46 Drawing Sheet(s) Filed in Color)

(56) References Cited

OTHER PUBLICATIONS

YouTube video entitled: "Footprint System—[UE4 Tutorial]," uploaded Dec. 26, 2017 by user "UnrealCG" [retrieved on Aug. 31, 2020]. Retrieved from the Internet: <URL:https://www.youtube.com/watch?v=bNfRgGOfq1k>, 1 page.

YouTube video entitled: "Snow Deforming Landscape Tutorial—UE4," uploaded Feb. 7, 2017 by user "Andre Allen" [retrieved Aug. 31, 2020]. Retrieved from the Internet: <URL:https://www.youtube.com/watch?v=pPKPSV5fiDc>, 1 page.

YouTube video entitled: "Unreal Engine 4 River Tutorial/Workflow," uploaded May 19, 2016 by user "Michal Arendt" [retrieved Aug. 31, 2020]. Retrieved from the Internet <URL:https://www.youtube.com/watch?v=FMVCVH7zuGI>, 1 page.

* cited by examiner

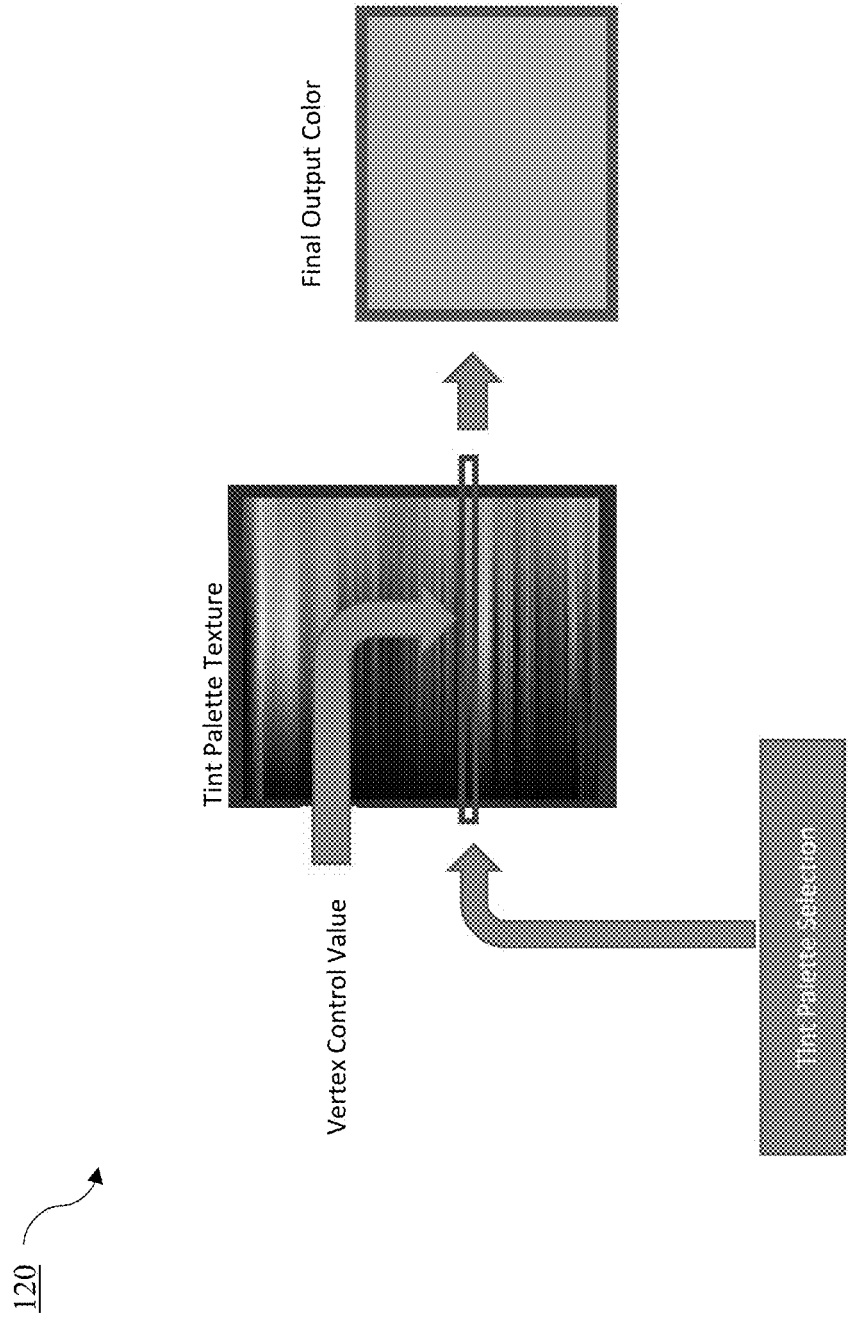
Fig. 1B *(Prior Art)*

210

210

250

260

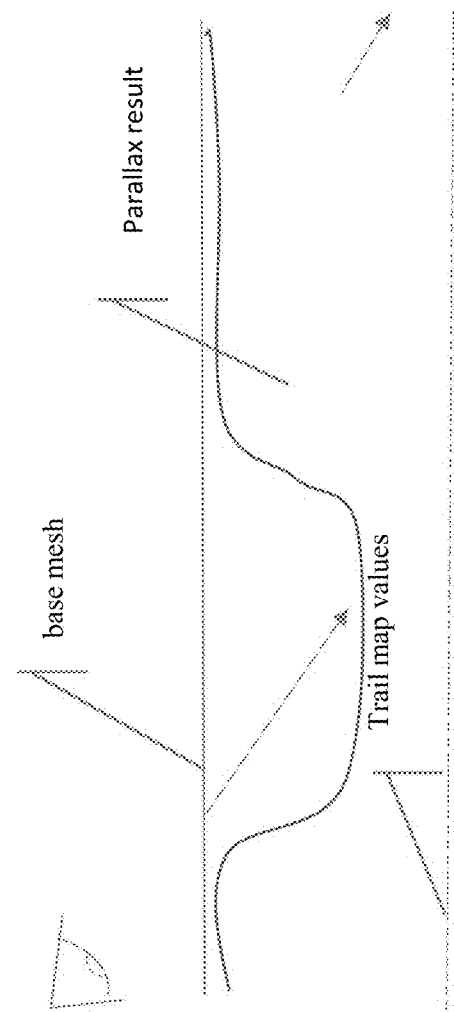

501

502

503

504

600

750

800

900

900

1000

1000

1000

1000

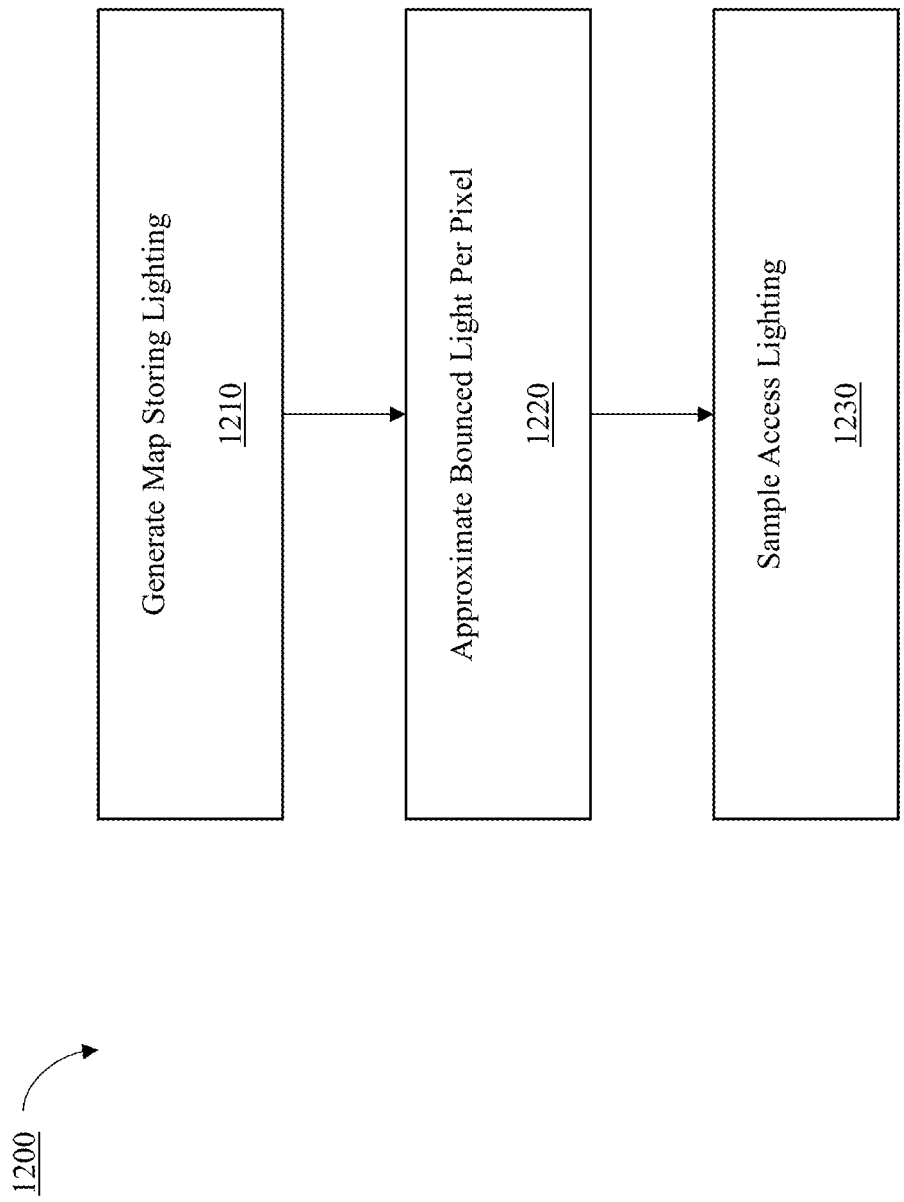

1400

1400

1500

1500

1600

1600

1601

1602

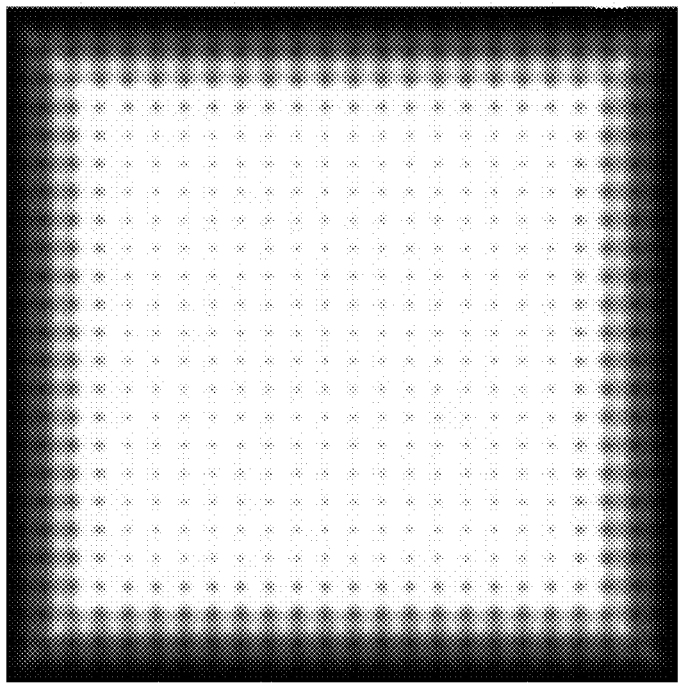
Fig. 16E
1603

1800

1800

1800

METHOD AND APPARATUS FOR ENHANCED GRAPHICS RENDERING IN A VIDEO GAME ENVIRONMENT

RELATED APPLICATIONS

This application is a divisional of U.S. application Ser. No. 16/373,514, filed Apr. 2, 2019, which is a non-provisional of, and claims priority to, U.S. Provisional Application Ser. No. 62/651,623, filed on Apr. 2, 2018, the disclosures of which are hereby incorporated by reference in their entirety and for all purposes.

FIELD

The present disclosure relates generally to video games, and more specifically, but not exclusively, to video game systems and methods to generate improved graphics rendering.

BACKGROUND

Computer games often comprise a graphically rendered three-dimensional (3D) space that represents a virtual world in which the players play the game. The 3D space must be rendered in real time using the processing power available to the game system, e.g., the central processing units (CPUs) and graphics processing units (GPUs) in a personal computer (PC) or game console.

Real time graphics rendering is typically performed in a rendering pipeline, such as shown in FIG. 1A. As shown in FIG. 1A, a simplified graphics rendering pipeline 100 is shown and starts by processing 3D vertex information, e.g., the location of all the objects in the scene, and then renders the pixel level details, e.g., light, color and shadows. In current graphics systems, the pixel level rendering is performed by one or more "shaders," which are programs that run on a GPU and define the processing performed to render given screen elements.

This rendering must balance available processing power between rendering realism and detail against the need to display the game at a sufficiently high frame rate to ensure smooth game play. For example, a virtual world should illustrate various terrains that mirror a number of lifelike geographical areas. Each of these terrains can provide unique interactions with a virtual character in the video game. By way of example, a virtual player traveling through sand or snow should leave footprints that are different than the virtual player walking down a concrete sidewalk. However, because of the number of various terrains that need to be accounted for and the unique behavior of each terrain, conventional graphics systems do not have enough processing power to account for dynamic terrain and the associated interaction with players of the game.

As another example, the pixel rendering shown in the simplified graphics rendering pipeline 100 also includes a lighting stage. In some conventional systems, a cube map can be used to pre-render lighting for 3D worlds, including ambient illumination, such as described in "Shading in Valve's Source Engine," by Jason Mitchell, Gary McTaggart, and Chris Green, Advanced Real-Time Rendering in 3D Graphics and Games Course, 2006, available at http://www.valvesoftware.com/publications/2006/SIGGRAPH06_Course_ShadingInValvesSourceEngine.pdf. This article is hereby incorporated by reference in its entirety and for all purposes. The cube map, for example, can provide ambient lighting for objects in the game, e.g., visibility of the sky as a pre-computed light map for the static components of the world. For dynamic characters and other objects moving through the space, an approximate ambient occlusion value can be given. However, pre-computed ambient lighting cannot account for changes to the ambient lighting from objects placed in the scene after the pre-computed values are determined. For example, a door that opens and closes might result in different ambient lighting effects when the door is open and light is coming into the room than when the door is closed during the game.

Ambient occlusion can be prebaked into textures which applies to surfaces in the scene. However, prebaking ambient occlusion into textures can be fast to render, but does not create a realistic simulation for dynamic objects that move as the ambient occlusion should update for those dynamic objects. Because the occlusion is prebaked, it does not update. This can cause dynamic objects to not match the rest of the scene and reduce the realism of the final render.

In yet another example, in the real world, a substantial amount of light reflects off of the ground and back up. This has the effect of providing light to the underside of people and other objects that are not directly lit by the sun. Typical approximations add a static light to the underside of all objects but this does not allow for local differences in the incoming light and they are applied uniformly to the scene. Also, typical approximations lose the effect of 'color bleeding' where the light takes on the color of the surfaces it is reflected off. Other approximations are manually placed lights that emulate this reflected light, but this cannot deal with dynamically changing lighting conditions such as a moving sunlight. Existing real-time rendering systems do not adequately account for this bounce back lighting.

Finally, as another example, to develop a rich and engaging game world, it is advantageous to populate the world with variations of similar object. In other words, you do not want every simulated person, cow, gun, car, cart, ship, or animal generated in the game to look the same. Because the 3D model for many of these objects would be identical, variation was traditionally accomplished by creating different texture files to "paint" a different look on the object. For example, two variants of a cow model could be created—one with a texture to create a brown cow and the other with a texture to create a black cow. These prior art systems created the desired variety at a cost of artist time, computer memory, and resources to maintain a multitude of different hand-authored variants for each in-game object.

Material tinting allows for an outfit or pattern on an animal to have more variation. One character can have various different combinations of colored garments to create uniqueness. This can be explicitly set or randomly assigned. No extra textures are required for each unique variation, which saves considerable memory.

Tinting typically includes using a control value, tint palettes, and tint palette selection, such as shown in an exemplary material tinting process 120 of FIG. 1B. Each object can be rendered by a series of possible tint palettes. For each part of the object, the tint palette selection selects the tint palette. The control value then selects the color from that selected tint palette.

In some conventional systems, vertex color tinting can be used. Here, a control value uses a value stored on the vertex of a mesh. This control value is used to select a color from the selected tint palette.

This conventional approach allows for tinting variation per vertex. However, this approach does allow for variation as it is limited to simple color changes. Per-texel changes are not possible and rapid changes in the per-vertex control value can cause triangular artifacts.

Accordingly, there is a need for efficient graphics systems and algorithms for 3D graphics in games in an effort to overcome the aforementioned obstacles and deficiencies of conventional video game systems.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1B is an exemplary top-level flow diagram illustrating a conventional vertex color tinting process.

FIG. 3A is an exemplary diagram illustrating an embodiment of a parallax map that can be used with the trail map shown in FIG. 2E.

FIG. 12A is an exemplary top-level flow diagram illustrating one embodiment of a process for global illumination using the modified graphics rendering pipeline of FIG. 11.

FIG. 16E is an exemplary diagram illustrating an embodiment of the bounce map of FIG. 16C after applying the box filter of FIG. 16D.

Figure 1A:
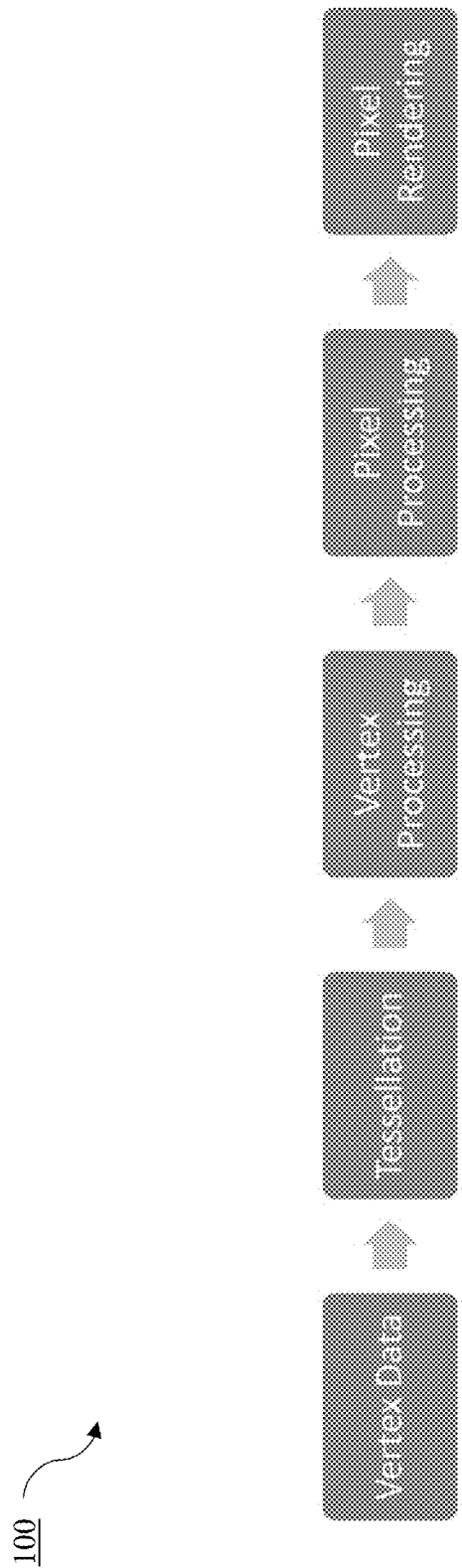
FIG. 1A is an exemplary top-level flow diagram illustrating a simplified conventional graphics rendering pipeline.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Dynamic Terrain System

Figure 2A:
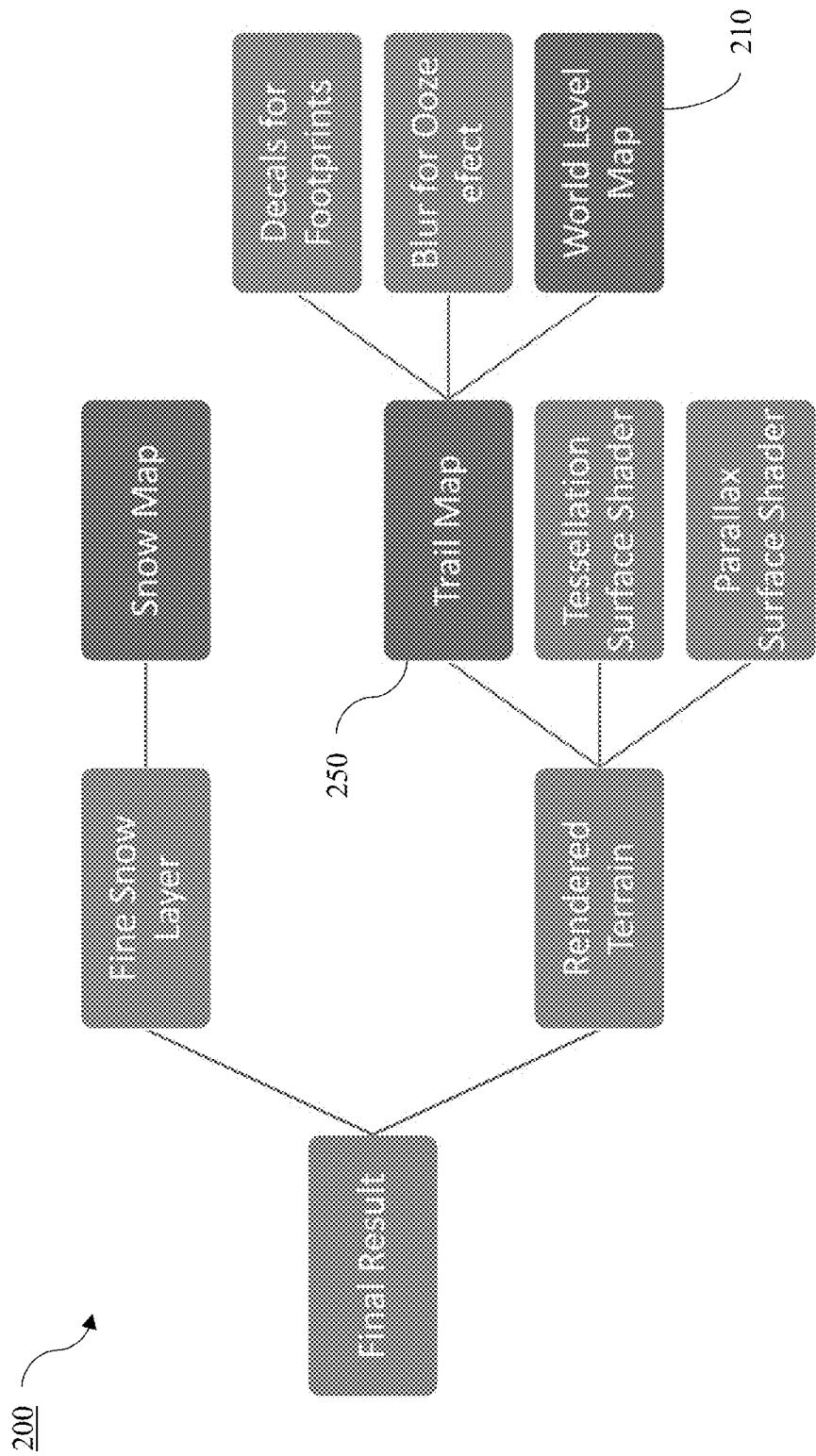
FIG. 2A is an exemplary diagram illustrating an embodiment of a shader system that can be used with the graphics rendering pipeline of FIG. 1A.
Figure 2B:
FIG. 2B is an exemplary screenshot illustrating an embodiment of the world map shown in FIG. 2A.
Figure 2C:
FIG. 2C is an exemplary screenshot illustrating an embodiment of a selected surface of the world map shown in FIG. 2B.
Figure 2D:
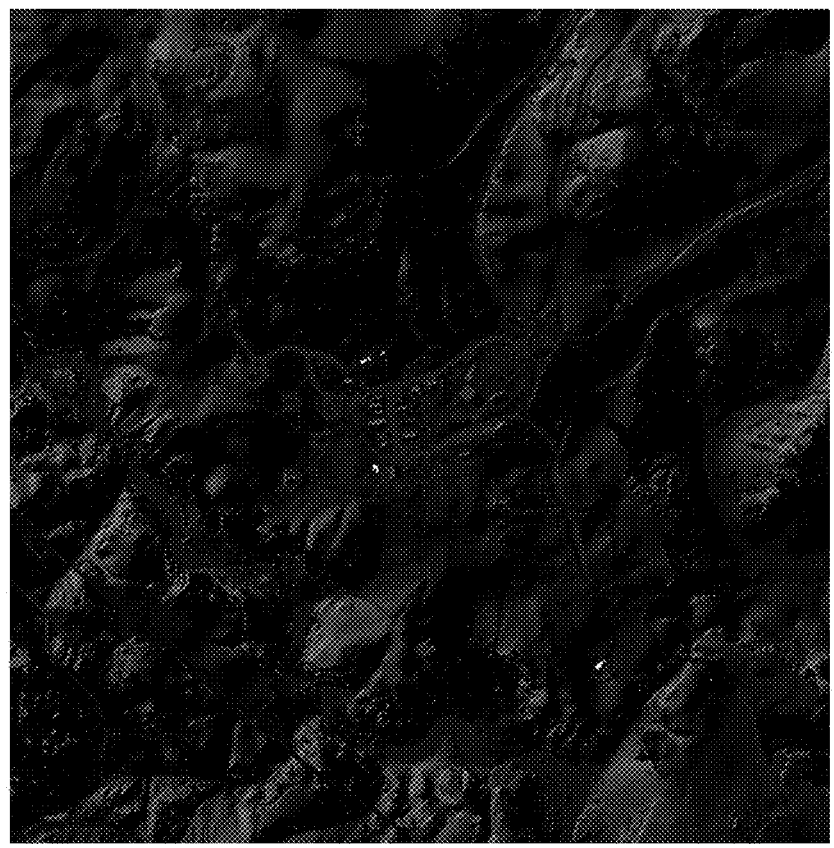
FIG. 2D is an exemplary screenshot illustrating an embodiment of the world map shown in FIG. 2A.

The present disclosure describes a number of methods and computerized systems for graphics rendering. In some embodiments, a shader system 200 is shown in FIG. 2A to efficiently render different types of terrain with high realism. The shader system 200 illustrates a number of shaders and textures that can be beneficial for a dynamic terrain system. Turning to FIG. 2A, a world level map 210 (or overview map) defines the different dynamic terrain areas within the game world. For example, some areas might be muddy, sandy, hard ground, grassy or snowy. An exemplary world level map 210 is shown in FIG. 2B. With reference to FIG. 2B, the world level map 210 defines areas of scree 211, snowy terrain 212, quicksand 213, and muddy terrain 214. FIG. 2C illustrates a detailed view of the world map 210 including, for example, lower-level details for the muddy terrain 214. FIG. 2D shows surface details for the muddy terrain 214 of FIG. 2C. Game design artists can use the world level map 210 to define the location of different terrain types as needed. Advantageously, the designers can make this designation of terrains without concern for the rendering details needed for each terrain area.

At runtime, the world level map 210 can be used to see if any specific dynamic terrain is active (e.g., will be displayed to the user). If so, it will generate a specific trail map 250 for the dynamic terrain that will affect the terrain. If not, then no trail map will be generated and simple shaders can be used having no trail effects, thereby reducing overhead for those effects that are not needed at runtime. The trail map 250 records any marks left on the surface by players, non-player characters (NPCS), and/or vehicles in the game. As players goes through the game world, they are shown trails relevant to them. The type of the trail map 250 is dependent on the surface type. Trail maps are a top down projected map located around the camera. Trail maps have different detail levels or resolutions. Blurring further can be applied to soften the trail or marks left on the surface. If this is done over multiple frames, the trail will flatten out like a liquid with the viscosity dependent on the strength of the blur. This effect is referred to as the ooze effect.

Figure 2E:
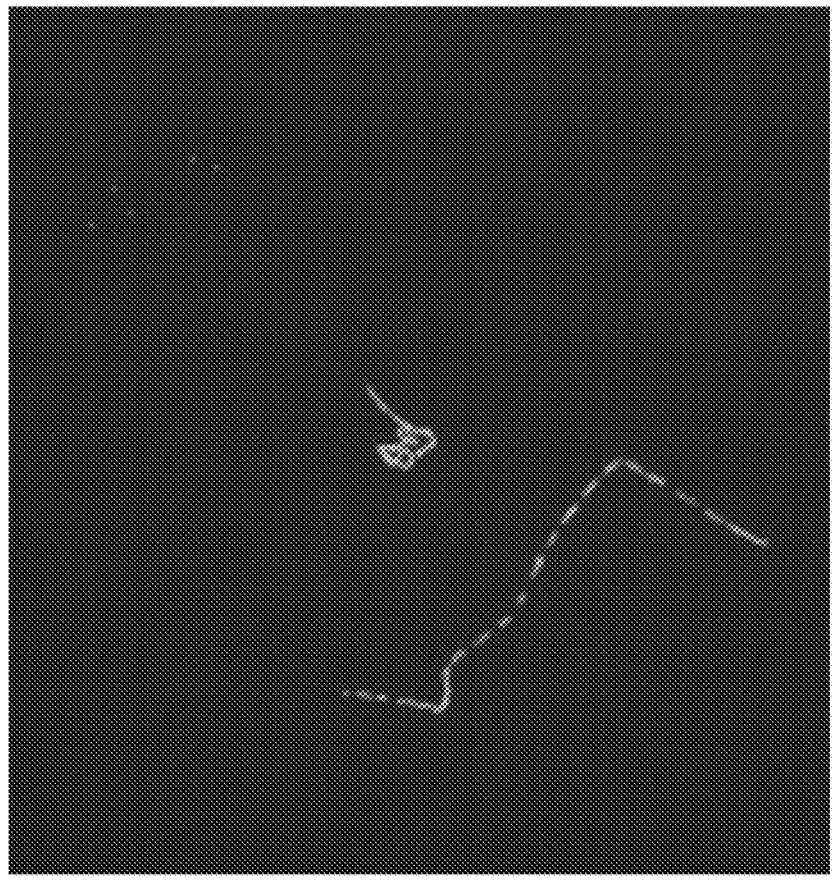
FIG. 2E is an exemplary screenshot illustrating an embodiment of the trail map shown in FIG. 2A.
Figure 2F:
FIG. 2F is an exemplary screenshot illustrating an embodiment of a video game scene that has been rendered using the trail map shown in FIG. 2E.

Turning to FIG. 2E, an exemplary trail map 250 is shown. The footprints of players or NPC's which are close to the camera are rendered directly into the trail map 250. Although footprints are shown for exemplary purposes, the trail map 250 can also include, without limitation, footsteps, limbs that are placed on the ground, areas cleared due to objects placed on the ground, and so on. In-game explosions can be added to the trail map as large irregular circles. The trail map 250 advantageously allows for NPC corpses, dragging bodies, snakes, and object placement to work within the trail system. By way of example, an exemplary screenshot 260 illustrating a scene rendered using the trail map 250 is shown in FIG. 2F. As shown in FIG. 2F, the scene includes complex trail details, for example, showing imprints from a corpse.

If the player is outside of a trail map area, the trail map 250 for that player is stored in a curve so it can later be added to the trail map 250 if the camera is within range. To render into the trail map, 'decals' are rendered where a player foot or animal hoof lands where it imprints the offset.

In some embodiments, trails are aged over time to allow for certain terrain which are soft such as snow or soft mud. For example, as described above, blurring can be applied to soften the trail or marks left on the surface of snow or soft mud. When done over multiple frames, the trail will flatten out like a liquid with the viscosity dependent on the strength of the blur. In other words, the trail map 250 includes a blur shader applied to each frame. Since this is repeatedly applied, the blur spreads over several frames to age and soften the trails.

As shown in FIG. 2A, different shaders of the shader system 200 are used for different terrain types and with different trail map types. For example, basic terrains do not require special shaders while shallow mud terrains can advantageously benefit from a parallax surface shader to efficiently show ruts and tracks in the terrain with a high detail trail map. As an additional example, deep mud terrain may use a tessellation surface shader to model the ruts and tracks in the mud.

In some embodiments, surface shaders receive the trail map texture, the trail map normal map texture, the location of the trail area, and displacement height for trails.

By way of example, two surface shaders can be used for a typical terrain with the associated trail maps.

Shallow Mud Surface Shader (or Parallax Surface Shader)—A shallow mud surface shader can be used for displacements that are visibly a maximum of 5 inches. The shallow mud surface shader uses parallax mapping to create the illusion that the surface is displaced. In other words, parallax surface shaders can render a displacement or difference in the apparent position of an object viewed along two different lines of sight, which is measured by the angle or semi-angle of inclination between those two lines.

With reference to FIG. 3A, an exemplary parallax map 310 for use with the parallax surface shader is shown. In some embodiments, the parallax map 310 displaces the texture coordinates at a selected point on a rendered polygon (e.g., base mesh) by a function of the view angle (relative to the surface normal) and the value of the height map (e.g., trail map 250 values) at that point.

Additionally and/or alternatively, multiple samples can be taken along the view direction in texture space. For example, after the parallax map 310 displaces the texture coordinate at a selected point, a new sample is taken at the selected point to determine whether the sample intersects the ray along the view direction. If the sample does not intersect, additional samples can be taken. Parallax mapping can be used to create the illusion of high-detail deformation where footprints are on the surface of the terrain. Although the surface is warped so it visibly looks as though it is displaced, warping is applied in the pixel shader so no actual movement of the polygon is applied. Advantageously, the shallow mud surface shader can use very high detailed displacements up to a predetermined height.

Deep Snow Surface Shader—The deep snow surface shader can use the tessellation hardware of the GPU to add new vertices to the mesh which are displaced using the contents of the trail map. A tessellation of a flat surface is the tilling of a plane using one or more geometric shapes (tiles) with no overlaps and no gaps. This has the most interaction with the scene, but is the most expensive to render. The deep snow surface shader uses adaptive tessellation to add more detail where the trail map 250 has detail and is close to the camera. Tessellation cannot support as high detail as parallax as it causes artifacts and is prohibitively expensive at those detail levels.

Figure 3B:
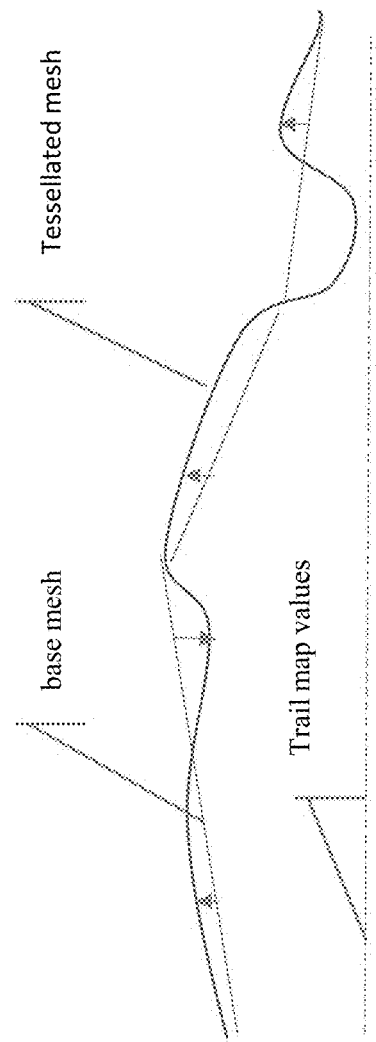
FIG. 3B is an exemplary diagram illustrating an embodiment of a tessellation map that can be used with the trail map shown in FIG. 2E.

In some embodiments, the tessellation surface shader generates a tessellation map, such as a tessellation map 320 shown in FIG. 3B. With reference to FIG. 3B, the tessellation surface shader uses the values in the trail map 250 to add new vertices to the base mesh and move those vertices to a new position. By using the displacements determined from the trail map 250 (e.g., lookup in the trail map 250 to determine a height value to add to the tessellated mesh at that point), imprints can be generated in the base mesh from footsteps and trails from vehicles can be added to the mesh.

Both shaders support per vertex control to reduce the amount of displacement for parallax and tessellation. This allows artists to paint out the displacement at the end of the trail areas, between different trail types, and between simple shader without any displacement. This gives a seamless transition to and from trail areas in the terrain.

Figure 4:
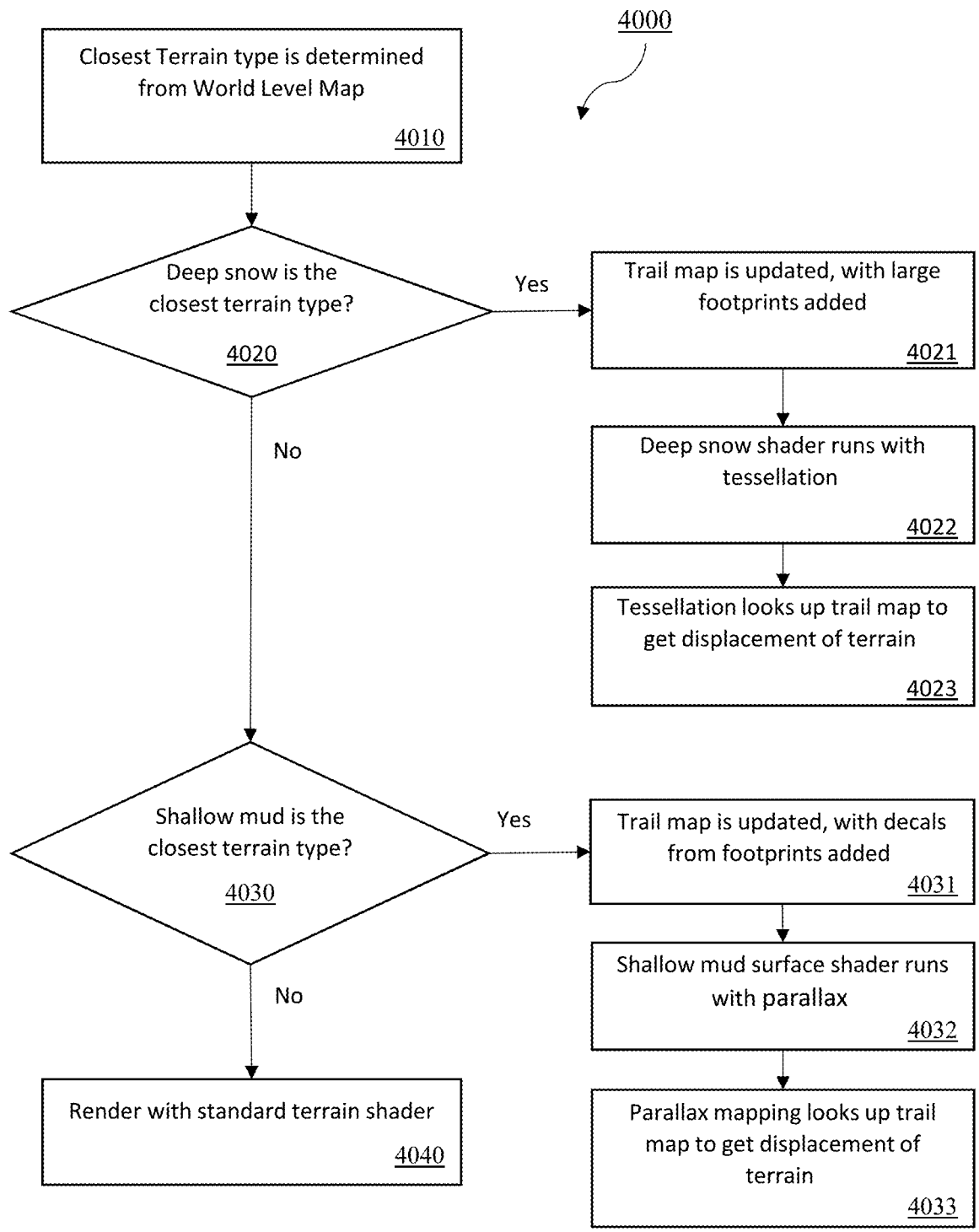
FIG. 4 is an exemplary top-level flow diagram illustrating one embodiment of a process for rendering using the shader system of FIG. 2A.

The shallow mud surface shader and deep snow surface shader can render a scene in any means described herein, such as by an exemplary process 4000, shown in FIG. 4. Turning to FIG. 4, the process 4000 begins by determining the type of terrain from the world level map, at 4010. If the determined terrain is closest to deep snow, at decision block 4020, the trail map 250 is updated, with large footprints added, at 4021. The deep snow surface shader runs with tessellation, at 4022. As described above, the deep snow surface shader can use the tessellation hardware of the GPU to add new vertices to the mesh that are displaced using the contents of the trail map 250. Specifically, the tessellation queries the trail map 250, at 4023, to determine the displacement of the terrain.

If the determined terrain is closest to shallow mud, at decision block 4030, the trail map 250 is updated, with decals from footprints added, at 4031. The shallow mud surface shader then runs with parallax, at 4032. Specifically, parallax mapping can query the trail map 250, at 4033, to determine the displacement of the terrain.

If the determined terrain is neither shallow mud nor deep snow, at decision blocks 4020 and 4030, the terrain is rendered with a standard terrain shader, at 4040.

By way of example, a virtual world including deep snow can be rendered with a medium detail trail map 250 and the deep snow surface shader. In some embodiments, a medium detail trail map 250 is projected over 96 meters using a 2048×2048 trail map texture. The medium detail trail map 250 provides a texel for every 5 cm. Similarly, a high detail trail map 250 is projected over 48 meters using a 4096×4096 trail map texture, resulting in a texel every 1 cm. Additionally and/or alternatively, a virtual world including deep snow can be rendered with a low detail trail map 250 where a medium detail trail map 250 would take too long to generate. The low detail trail map 250 is projected over 96 meters using a 1024×1024 trail map texture.

Figure 5A:
FIG. 5A is an exemplary screenshot illustrating an embodiment of a video game scene that has been rendered for deep snow using the process shown in FIG. 4.
Figure 5B:
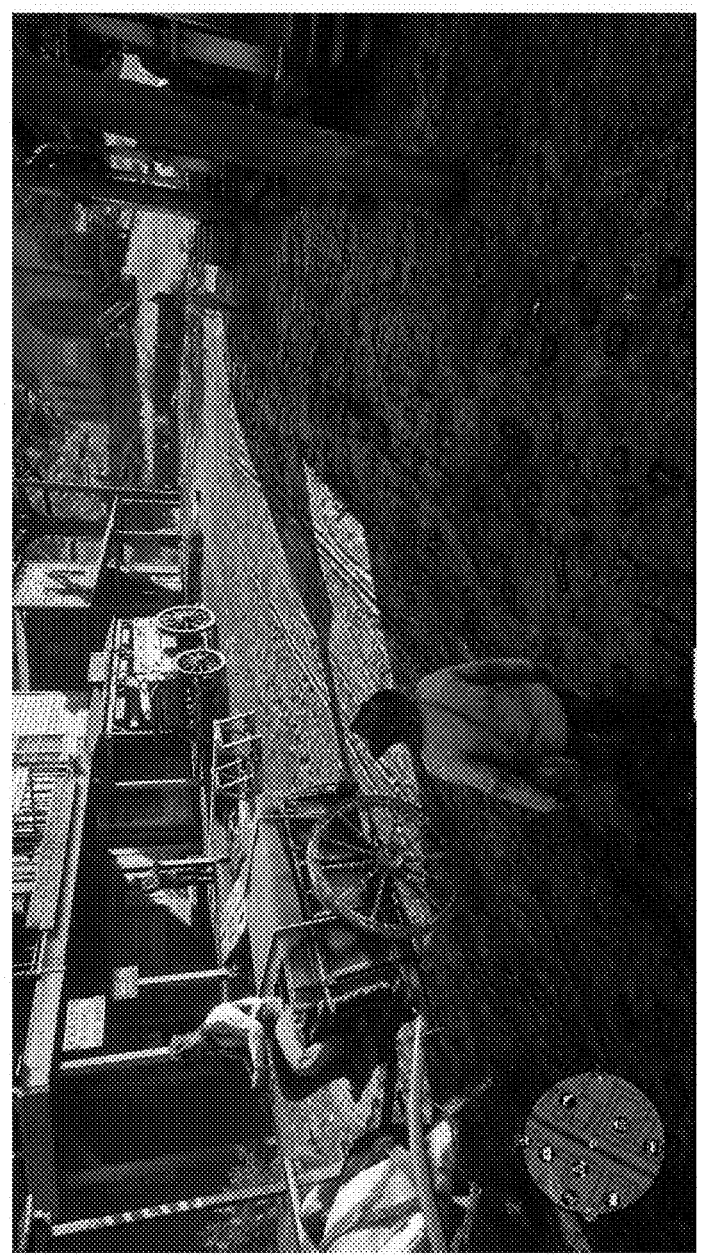
FIG. 5B is an exemplary screenshot illustrating an embodiment of a video game scene that has been rendered for shallow mud using the process shown in FIG. 4.
Figure 5C:
FIG. 5C is an exemplary screenshot illustrating an embodiment of a video game scene that has been rendered for quicksand using the process shown in FIG. 4.
Figure 5D:
FIG. 5D is an exemplary screenshot illustrating an embodiment of a video game scene that has been rendered for scree using the process shown in FIG. 4.

An exemplary video game scene 501 showing a rendered deep snow scene is shown in FIG. 5A. The video game scene 501 illustrates deep trails that are smooth and support both animal and human NPCs. Shallow mud can be rendered using a high detail trail map 250 with the shallow mud surface shader. An exemplary video game scene 502 showing a rendered shallow mud scene is shown in FIG. 5B. The video game scene 502 illustrates footprints and wagon tracks that are shallow and include high detail. Similarly, to render quicksand/mud, a low detail trail map 250 with the ooze effect can be used with the deep snow surface shader. An exemplary video game scene 503 showing a rendered quicksand/mud scene is shown in FIG. 5C. The video game scene 503 illustrates that blurring can be applied such that the trail is more viscous compared to the snow in the video game scene 501. Finally, scree or other areas of loose gravel or stones can be rendered using a low detail trail map 250 with an ooze effect and a deep snow surface shader. An exemplary video game scene 504 showing a rendered scree scene is shown in FIG. 5D. The video game scene 504 illustrates that scree can leave a subtle trail behind an NPC.

For an extra layer of fine snow, a snow map can be used to apply a layer of procedural snow over the terrain. The snow map adds an extra pass to the terrain where a fine snow layer is added where snow is painted in a world sized snow map. This allows for changing seasons by reloading the snow map rather than changing the terrain.

Ambient Occlusion

In some embodiments, the disclosed graphics system provides an advanced efficient rendering system with ambient mask volumes (AMV). These AMVs advantageously describe how large objects in the environment occlude the ambient light, thereby efficiently creating a more realistic lighting model.

Figure 6:
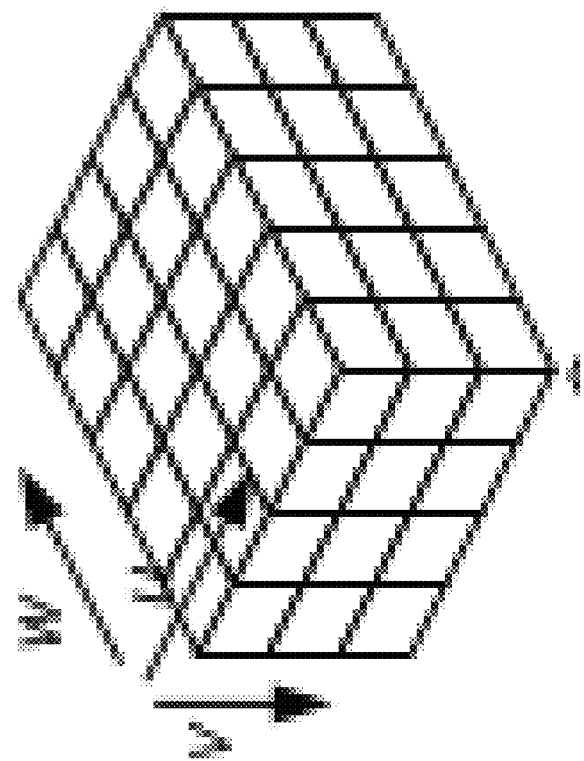
FIG. 6 is an exemplary diagram illustrating an ambient mask volume cube that can be used with the graphics rendering pipeline of FIG. 1A.

An ambient mask volume stores ambient occlusion in values in a three dimensional texture, such as an ambient mask volume cube 600 shown in FIG. 6. This texture can be projected into the world in two ways. For buildings and box shaped areas, the volume is projected onto a box.

Figure 7A:
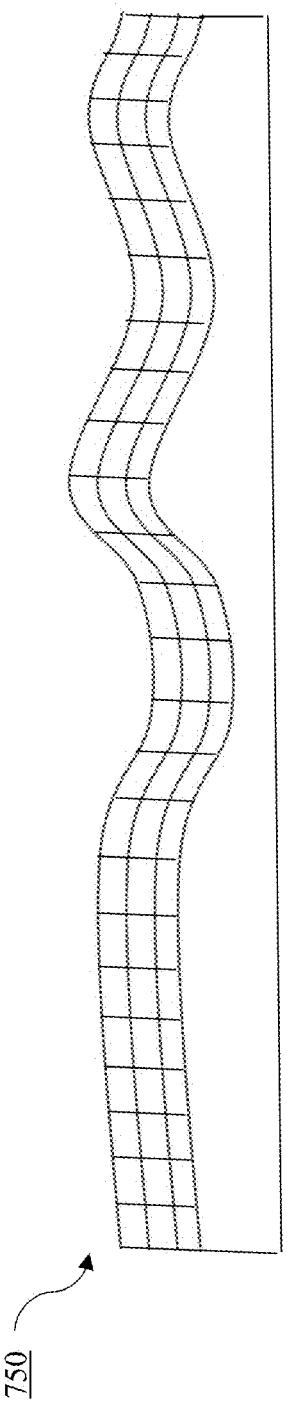
FIG. 7A is an exemplary diagram illustrating a projection of a portion of the ambient mask volume cube of FIG. 6 onto a terrain in two dimensions.

For large areas, such as a terrain, a large ambient mask volume is projected onto the surface of the terrain, such as shown in FIG. 7A, so the amount of data stored is viable. In some embodiments, projecting the ambient mask volume terrain includes storing the world height map of the terrain and converting a world position to terrain ambient mask volume position. The conversion preferably includes subtracting the world height map and dividing by the cell height to get the cell location. Stated in another way, projecting a terrain ambient mask volume onto a terrain in two dimensions isolates the detail to the areas that require the most rendering, thereby reducing memory cost.

In other words, the world height map can represent a two-dimensional top-down map of height over the entire terrain in the virtual world. For each point on the surface of the on-screen terrain, the cell location height is equal to the world position height subtracted by the world height map at that selected location. The ambient cube sample is equal to the terrain ambient mask as a function of the world position and the cell location height.

Figure 7B:
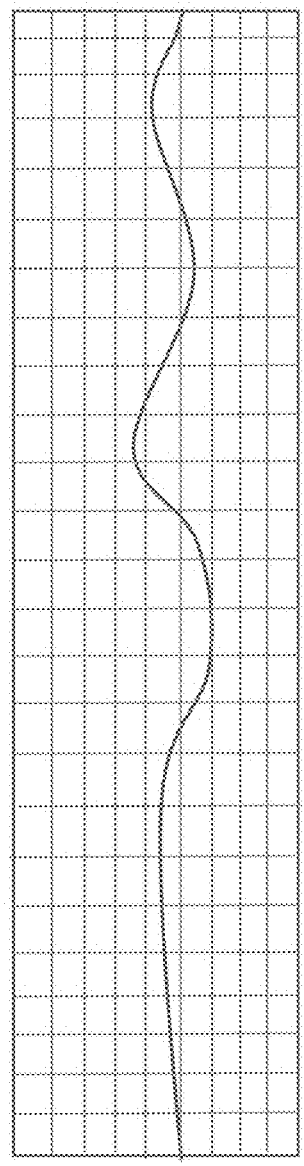
FIG. 7B is an exemplary diagram illustrating a projection of the entire ambient mask volume cube of FIG. 6 onto a terrain in two dimensions.

By way of example, projecting the terrain ambient mask volume as shown in FIG. 7A can save considerable memory compared to a projection of the entire grid, such as shown in FIG. 7B. As shown in FIGS. 7A-B, the memory required to project the entire grid shown in FIG. 7B can be three times as much (24×9 grid) as isolating the detail shown in FIG. 7B (24×3 cells). Accordingly, unnecessary terrain details are not rendered, thereby making additional data storage available.

Figure 8:
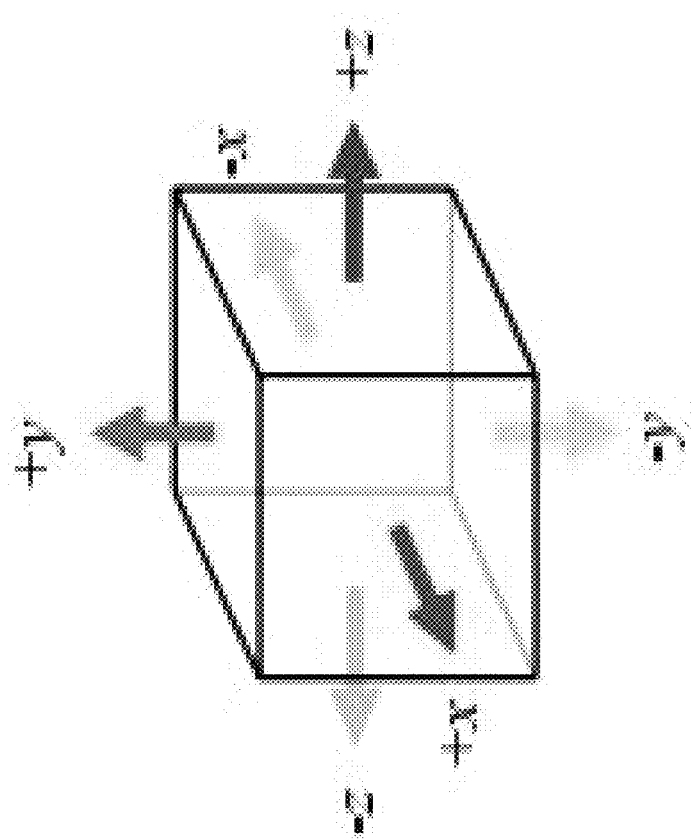
FIG. 8 is an exemplary diagram illustrating an ambient cube basis that can be used with the graphics rendering pipeline of FIG. 1A.

For each cell in a texture, since the ambient occlusion is dependent on direction, the direction is stored in an ambient cube basis, such as shown in FIG. 8. The normal on the surface is used to calculate the final ambient occlusion value. In some embodiments, the ambient cube basis stores up to 6 values. Depending on the direction of the normal, the ambient cube basis uses the values in that direction weighted by the absolute normal value in that given direction.

In some embodiments, the ambient cube basis is generated offline where the scene at each point in an ambient mask volume is rendered. For each point, a sky visibility cube map is rendered where the surfaces are black and the sky is white. This allows for a simple convolution to get the final value for each side of the ambient cube stored at each cell. The final values are stored in multiple ambient mask volumes. This process is distributed on multiple machines in tiles to allow generation of high detail ambient mask volumes within a predetermined timeframe.

By way of example, for a large terrain, a 3D texture is stored in the ambient cube basis having six values. Each side of the cube stores the sky visibility at the location center for that cell. In other words, each value is stored for each axial direction (e.g., +X, −X, +Y, −Y, +Z, −Z).

In a preferred embodiment, for a terrain ambient mask volume that follows the terrain, 2.4 billion points are generated with 1 probe every 2 meters.

Figure 9A:
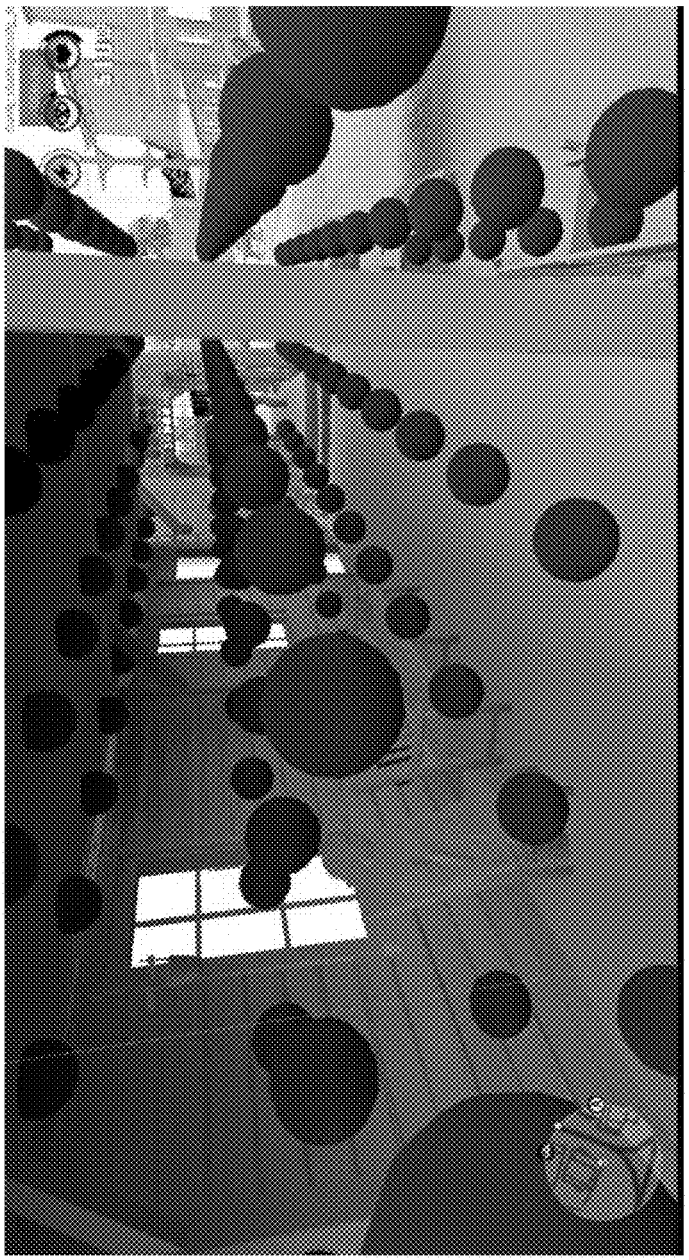
FIG. 9A is an exemplary screenshot illustrating an embodiment of ambient cube sample points stored in the ambient mask volume for a sample scene.
Figure 9B:
FIG. 9B is an exemplary screenshot illustrating an embodiment of the rendered scene of FIG. 9A using the ambient cube sample points.

With reference to FIG. 9A, a sample scene 900 illustrates the ambient cube sample points stored in the ambient mask volume. Using these ambient cube sample points, the scene 900 can be rendered as shown in FIG. 9B.

Figure 10A:
FIG. 10A is an exemplary screenshot illustrating an embodiment of a first layer of an ambient mask volume that can be applied to a sample scene.
Figure 10B:
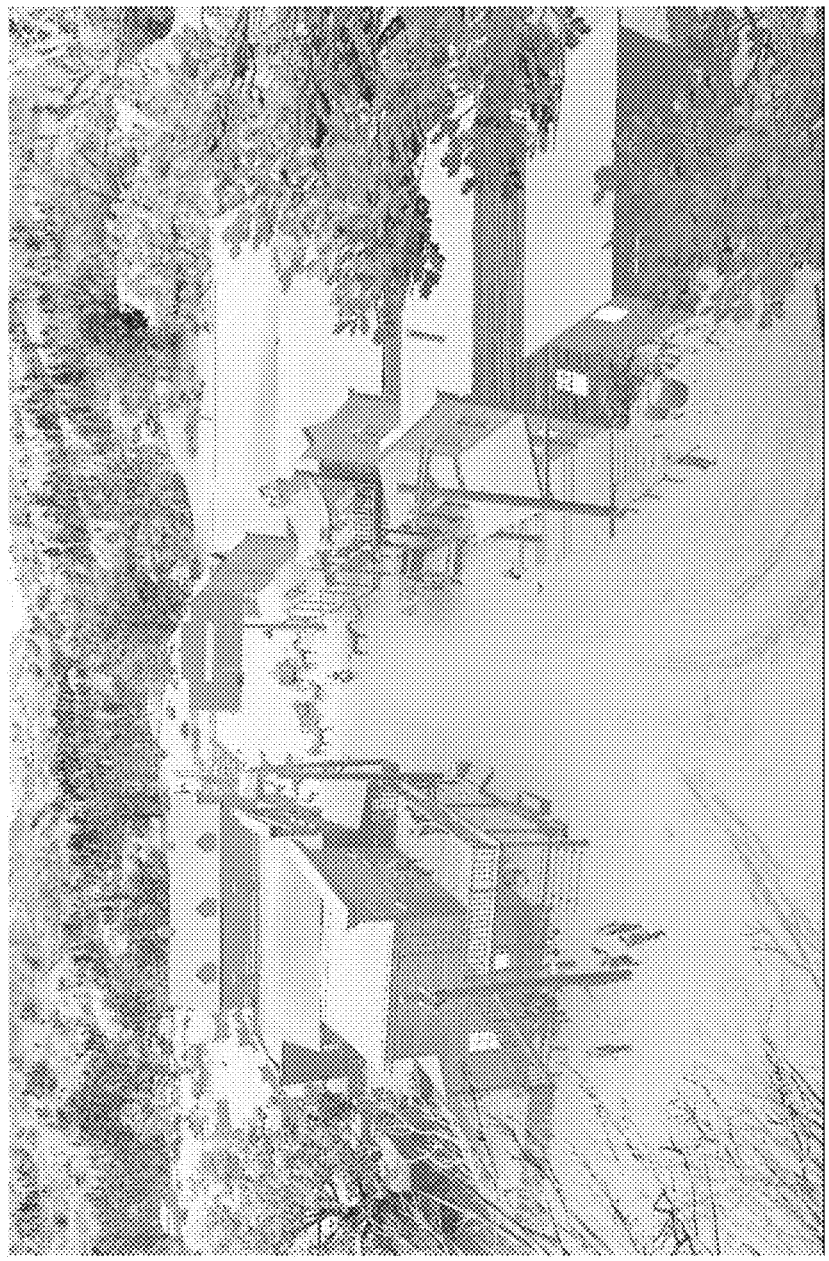
FIG. 10B is an exemplary screenshot illustrating an embodiment of a second layer of an ambient mask volume that can be applied to a sample scene.
Figure 10C:
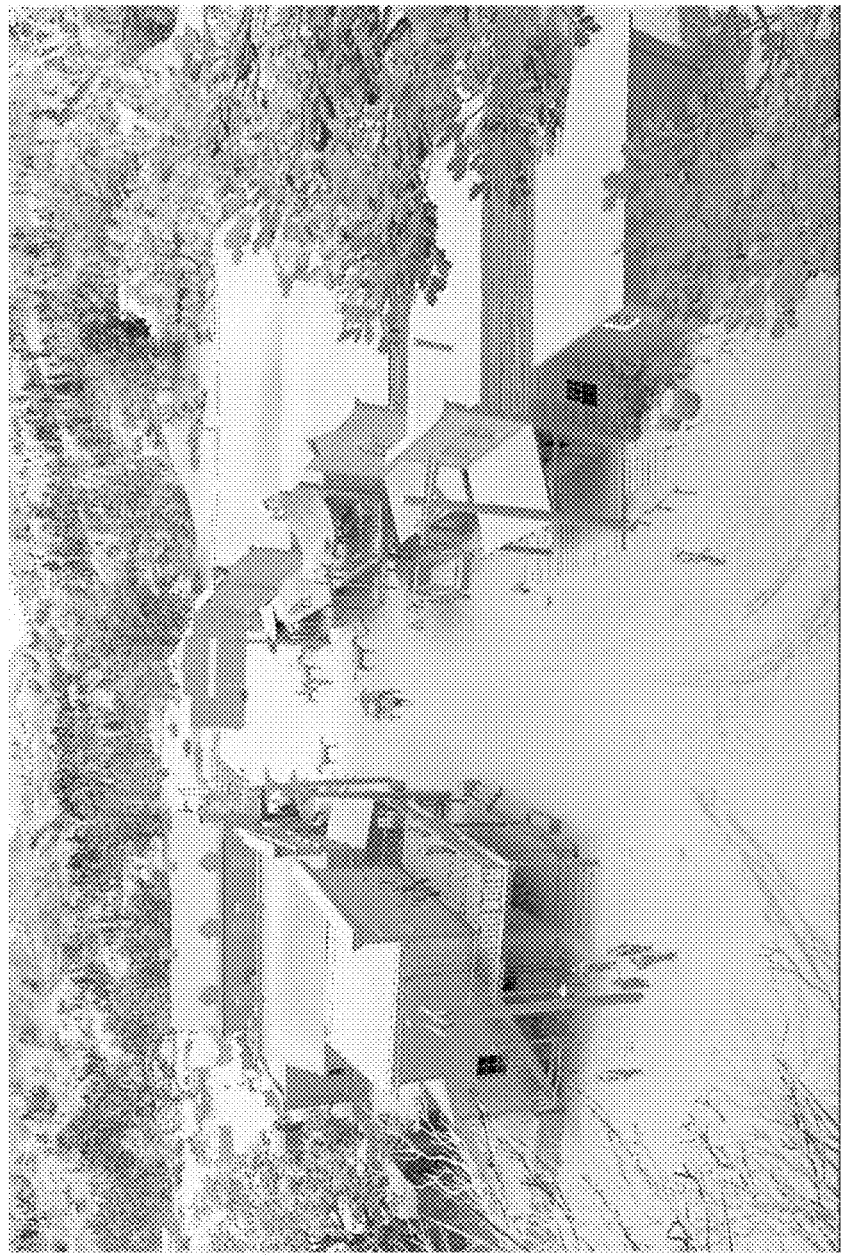
FIG. 10C is an exemplary screenshot illustrating an embodiment of a third layer of an ambient mask volume that can be applied to a sample scene.
Figure 10D:
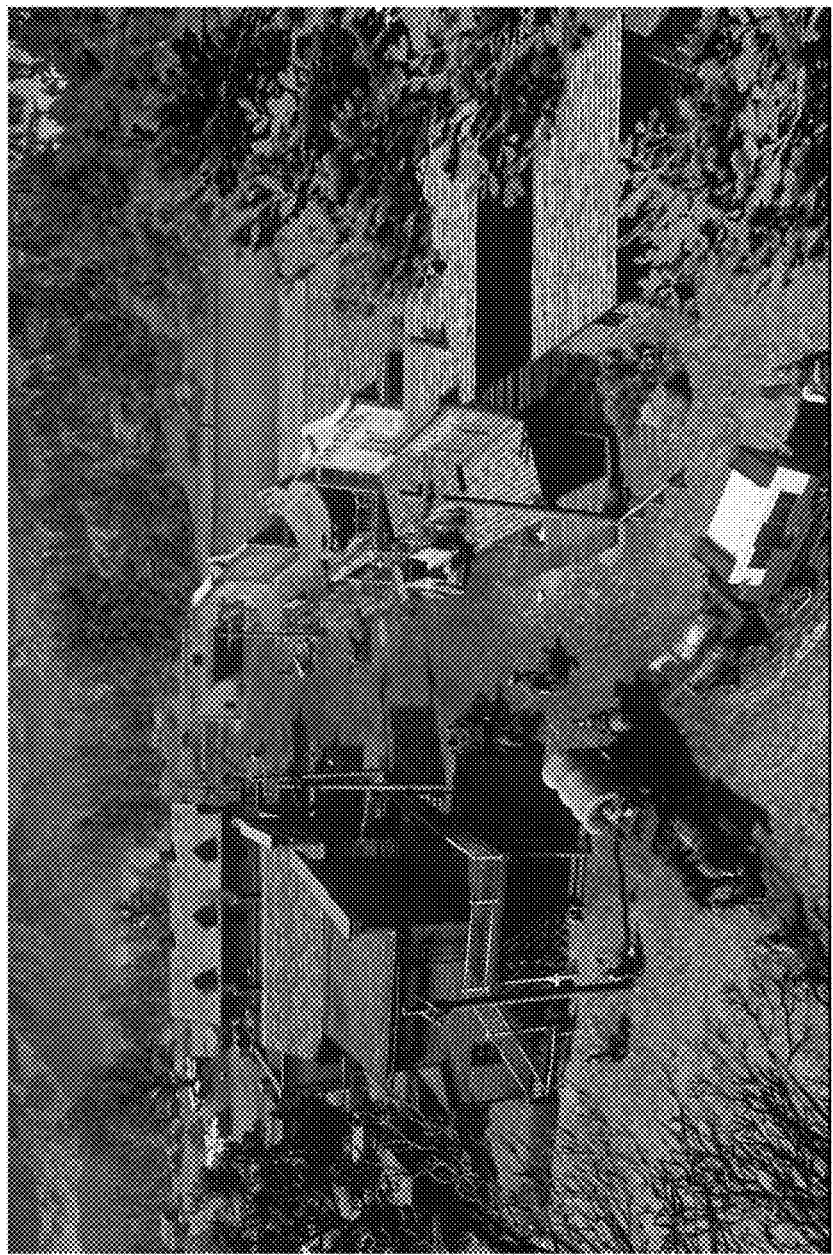
FIG. 10D is an exemplary screenshot illustrating the sample scene that has been rendered using the layers of the ambient mask volume of FIGS. 10A-C.

Ambient mask volumes can also be applied in any manner described herein. For example, when generating the runtime ambient occlusion per pixel values, the ambient mask volumes can be applied in layers, such as shown in FIGS. 10A-D. A first layer can represent a low resolution terrain ambient mask volume, such as shown in the exemplary scene 1000 in FIG. 10A. This ambient mask volume follows the terrain and is low detail so it can render far to the horizon. A second layer can represent the high-resolution terrain ambient mask volume where the detail is streamed in near the camera, such as shown in FIG. 10B. This allows for high detail without overflowing the memory budget. A third layer can represent separate ambient mask volumes around areas of detail, such as shown in FIG. 10C. As shown in FIG. 10C, the areas of detail are included in the high-resolution terrain and building ambient mask volumes. They are streamed in when near the camera to minimize memory usage. A fourth layer can represent ambient mask volumes for building interiors (not shown). These are applied within the volumes and to pixels that are inside the interior of a building. An exemplary scene that has been rendered using these layers is shown in FIG. 10D.

For dynamic objects, such as vehicles, a baked ambient mask volume is placed over the dynamic object and moves with the object. For opening and closing doors a new baked ambient is placed over the area of the door as it opens.

In some embodiments, blend ambient mask volumes can be used for crossing two different building areas which have a harsh transition.

In a preferred embodiment, the layers of the ambient mask volumes can be applied to the top layer first and exclude the layers below. Accordingly, only one layer is applied per pixel except for dynamic ambient mask volumes or blend ambient mask volumes which are blended with the previous layer. This allows for a plurality of layers while maintaining a cost of roughly one layer per pixel.

When the camera is moved, for any close-by interior, building, or high resolution terrain, ambient mask volumes are streamed in while ambient mask volumes no longer visible and released from the system.

By way of additional examples, an interior mask volume can be applied to interiors only for each interior ambient mask volume. Similarly, simple ambient mask volumes can be applied for each building. For all exterior pixels left and pixels close to a camera, high level of detail terrain ambient mask volumes can be rendered. For all exterior pixels left, a low level of detail terrain ambient mask volume is rendered.

For each blendable building ambient mask volume, ambient mask volumes are blended. For each vehicle or doorway, a transformed ambient mask volume is blended.

Global Illumination

The present disclosure can efficiently account for light reflected from the ground. In some embodiments, the system uses a bounce map that is projected in top-down fashion to determine reflected light. The bounce map is converted into a texture that provides an approximation for the expected bounce back of light. The bounce map provides per frame, dynamic shadows, intensity and brightness affecting the surfaces of objects in the scene. Accordingly, the bounce map advantageously simulates the effect that would be achieved rendering the multiple passes of lighting to account for the natural bounce reflections.

Figure 11:
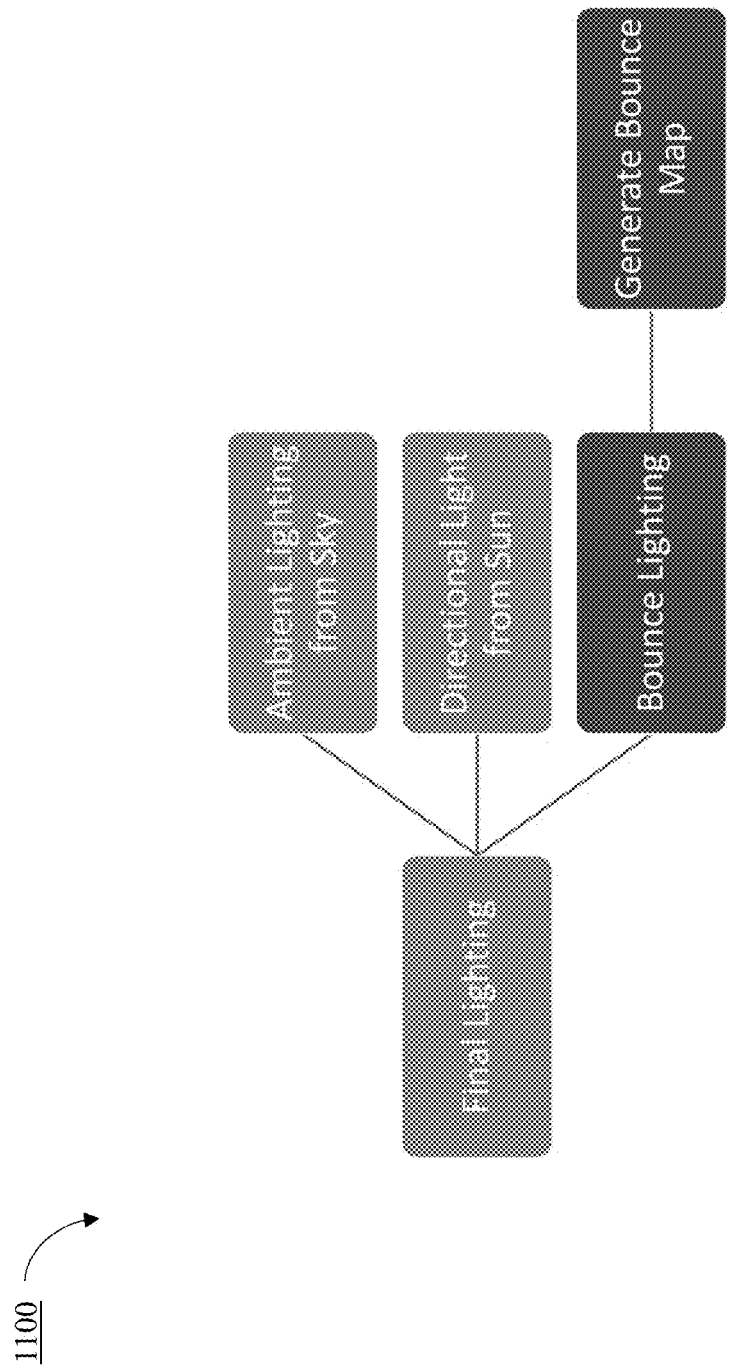
FIG. 11 is an exemplary flow diagram illustrating a modified graphics rendering pipeline of FIG. 1A to include bounce lighting.

In some embodiments, the bounce lighting can be integrated into a lighting pipeline as an extra full screen pass or extra shader code, such as shown in FIG. 11. Turning to FIG. 11, the process uses the intersection of a cone and plane to get a circle describing the portion of the ground that would reflect bounce back light. The cone and the height of the surface uses a mipmap (MIP map) to get the lighting at that level. This efficiently provides the benefits of realistic under lighting. This provides many of the benefits of ray tracing without the computational expense. The cone intersection with a plane can represent a gross approximation to the hemisphere of reflected light incident on the surface.

Turning now to FIG. 12A, an exemplary process 1200 for global illumination including the bounce lighting pipeline described in FIG. 11 is shown. As shown in FIG. 12A, a first pass includes generating map storing lighting, at 1210. In this step, a texture map storing the reflected light of the scene from a top down view is generated. In some embodiments, the texture map (referred to herein as a "bounce map") is generated by rendering the scene lit by the sunlight with the camera above the scene and facing downwards. Each texel of the map stores the reflected color as a red/green/blue (RGB) triplet.

Figure 12B:
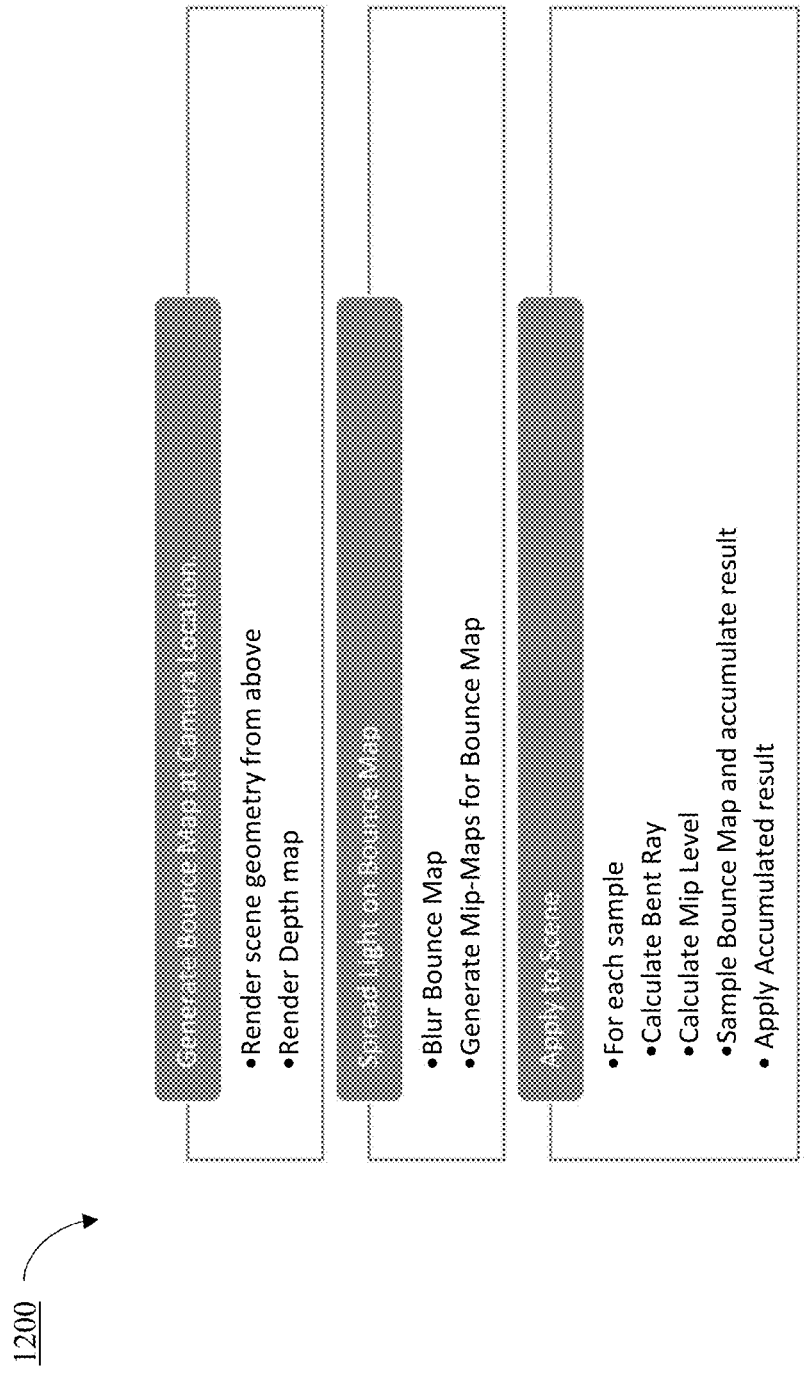
FIG. 12B is an exemplary flow diagram illustrating an embodiment of a data flow for multiple area sample access of a bounce map.

By way of example, with reference to FIG. 12B, an exemplary data flow diagram for multiple area sample access of a bounce map is shown. The bounce map is first generated for the scene geometry from above as described.

To allow for finding the height of the of the terrain at a point when rendering the top down bounce map, the height of each texel is stored in a depth map (referred to herein as a "bounce depth map") at the same resolution as the bounce map. Rendering to a depth map can be supported by GPU hardware for efficient rendering. In some embodiments, the GPU efficiently renders a depth only surface by rendering scene geometry and storing only the distance to the geometry. For example, the pixel rendering stage of the pipeline shown in FIG. 1A can be removed to improve performance. The depth generated represents the distance from the camera to the selected object.

As shown in FIG. 12B, a box blur filter can be applied to the texture map to spread the reflected light in an area. In other words, the box filter is applied so that each pixel on the result is the average of the surrounding neighborhood of pixels. If the blur is too large, then light will leak from occluded surfaces on the bounce map. If the blur is too small, then more samples can be used in the second pass.

Multiple layers of blurred textures can then be generated for this texture (e.g., a mipmap to prefilter a texture), each layer at different sizes of blur and lower resolutions. Generating multiple layers of blurred textures optimizes efficiency to allow for a reduced number of samples later when the texture map is accessed.

Following the first pass for generating a map storing lighting on the ground, the process 1200 continues with a second pass of determining the bounced light per pixel from the ground, at 1220. This is a pass over every pixel on the screen that uses the pixel position and the normal to the surface at that point. For this pixel, the light reflected from the bounce map is determined to approximate the light reflected from the ground. To get the height of this pixel position over the ground, the bounce depth map is used to compare to the height of the current pixel. The rest of the ground is treated as being a horizontal plane at this height. This approximation allows for very simple ray intersection test to determine how light hits the surface after being reflected off the ground.

Following the second pass for approximating bounced light per pixel, at 1220, the bounce map is sampled for access lighting, at 1230. Sampling the bounce map can occur at any predefined frequency dependent on quality and level of GPU resources. For example, the bounce map can be sampled once for an approximate solution, thereby using few GPU resources. Or the bounce map can be sampled four to sixteen times for a more physically accurate solution, each sample including a calculation of a location and a texture sampling.

Figure 13A:
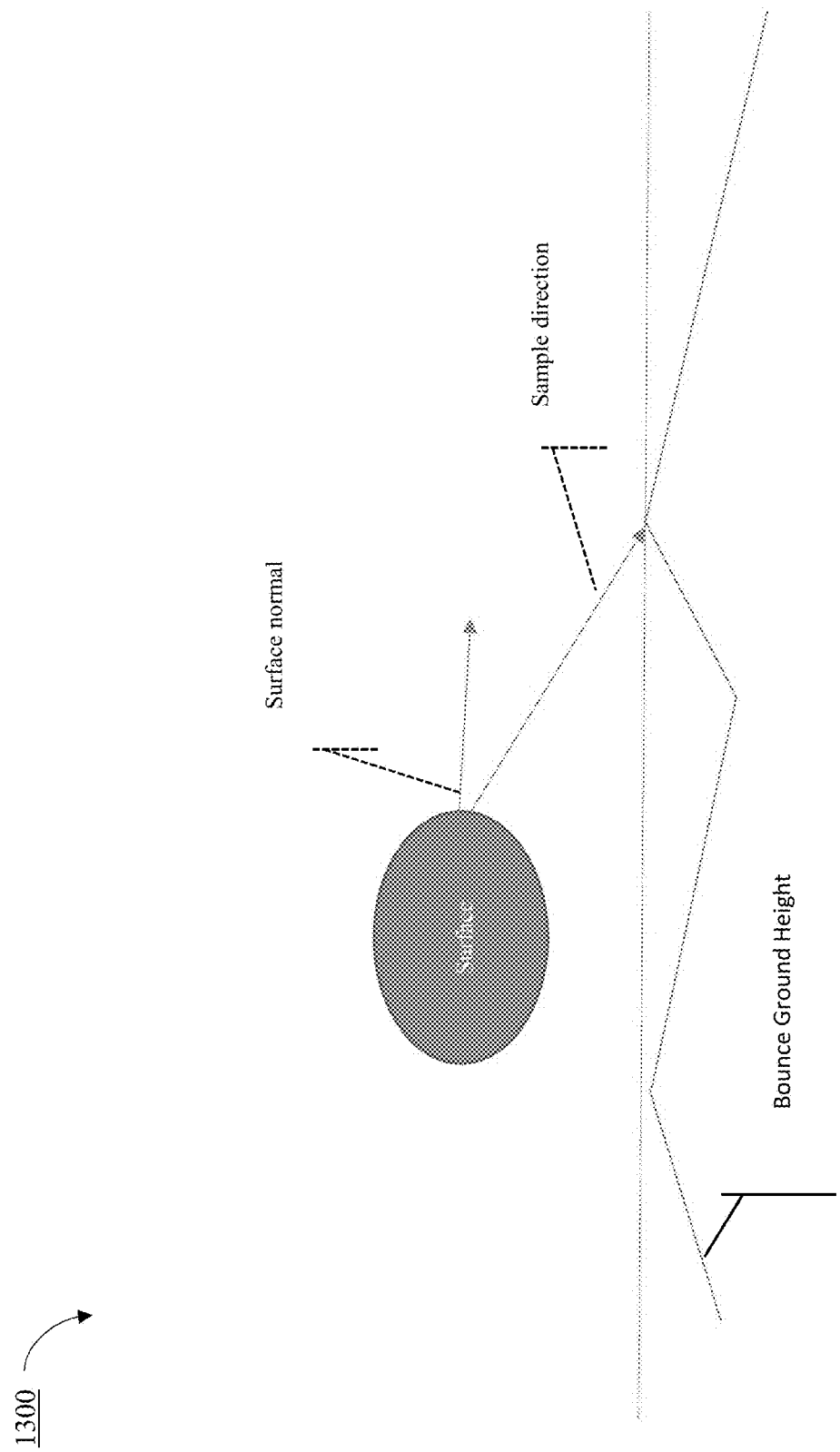
FIG. 13A is an exemplary diagram illustrating one embodiment of a single sample access for use with the global illumination process of FIGS. 12A-B.
Figure 13B:
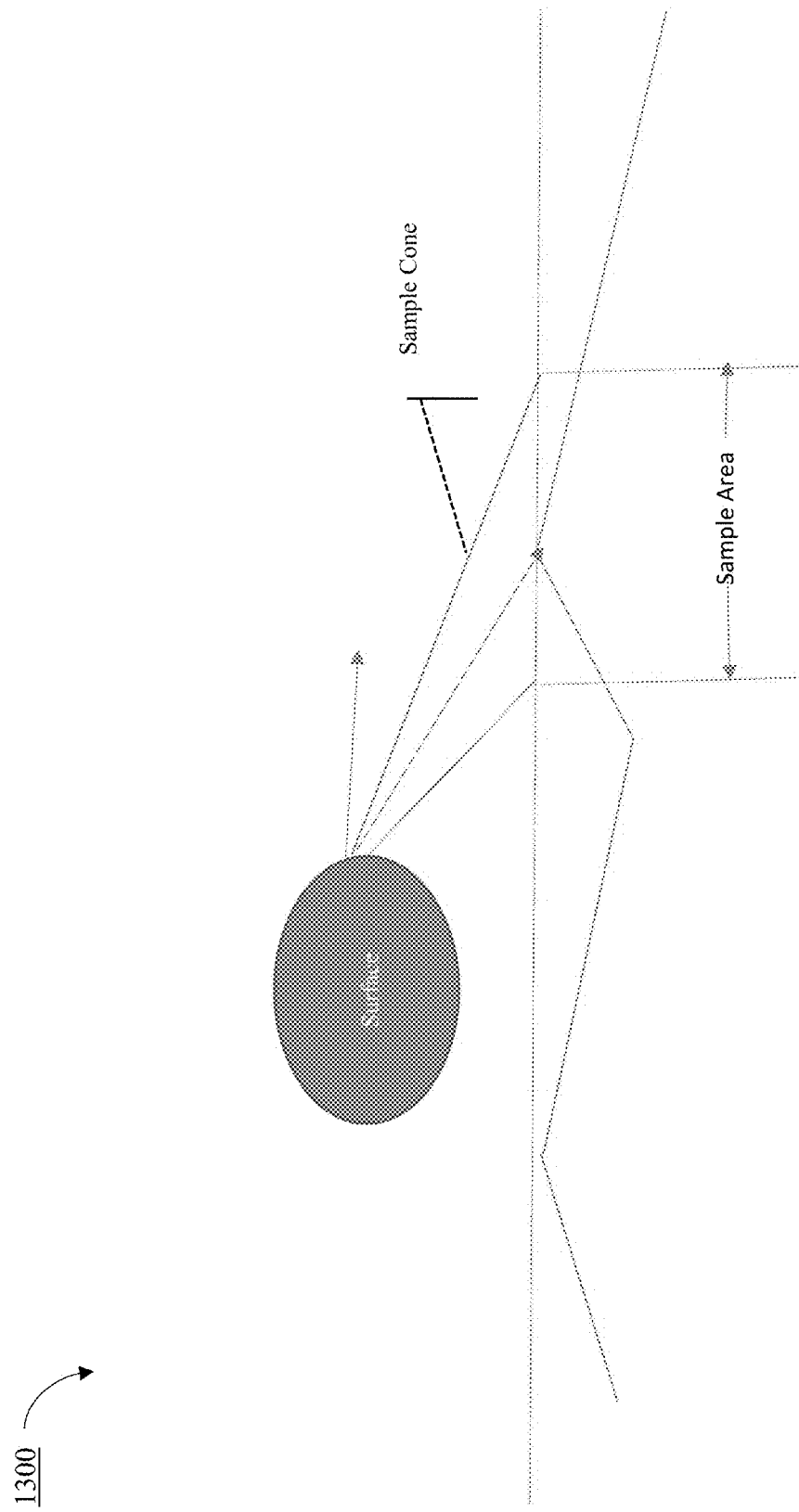
FIG. 13B is an exemplary diagram illustrating one embodiment of an area sample access for use with the global illumination process of FIGS. 12A-B.
Figure 13C:
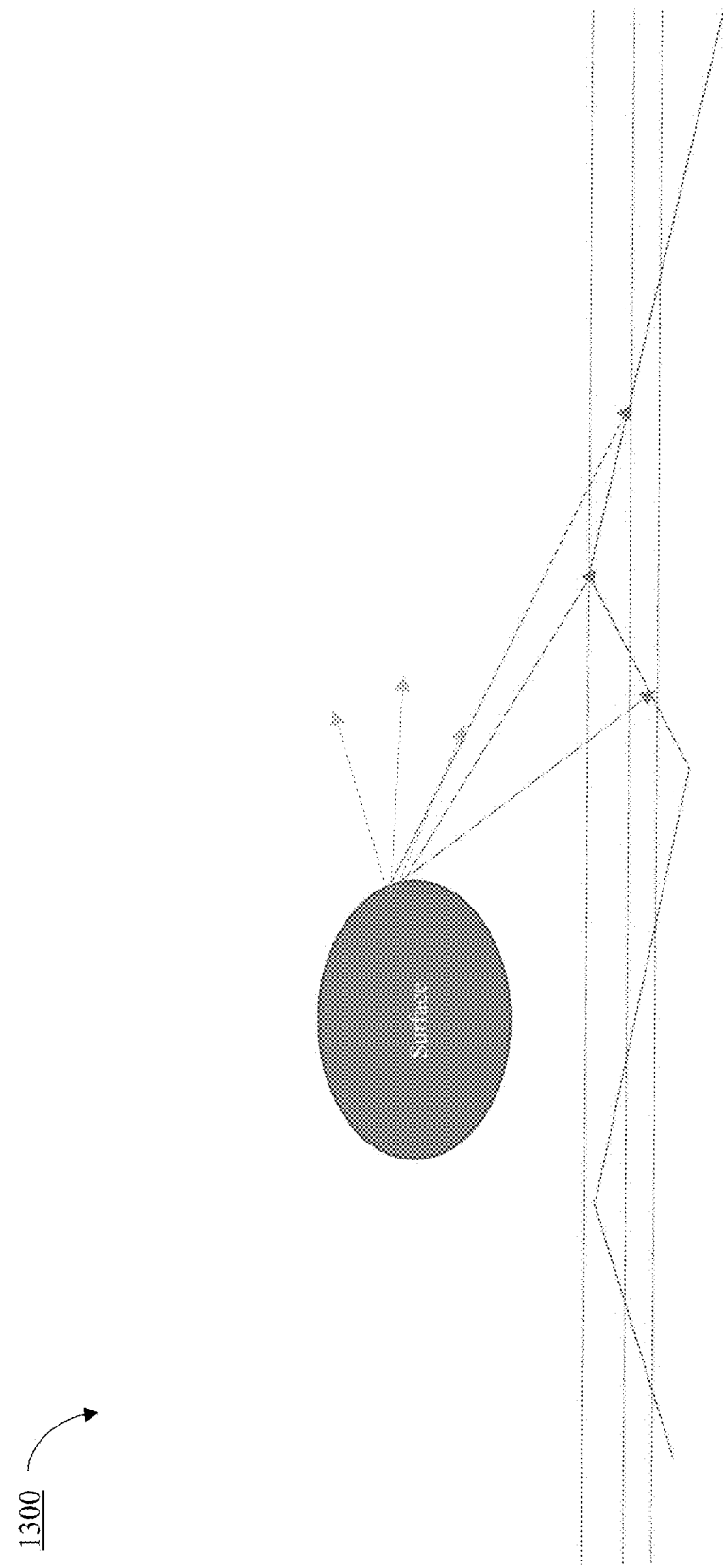
FIG. 13C is an exemplary diagram illustrating one embodiment of a multiple sample access for use with the global illumination process of FIGS. 12A-B.

For example, FIGS. 13A-C illustrate alternative methods for sample access. Turning to FIG. 13A, a single point sample access of a bounce map is shown. As shown, the approximate direction where most reflected light will be incident on the surface is determined by bending the surface normal downwards towards the ground plane direction. This creates the reflection incoming light direction.

The intersection of the ray along this direction is determined with the ground plane. As previously discussed, this is easily identifiable due to the plane approximation. This intersection point is converted to a location on the bounce map. By sampling the bounce map at this point, an approximate value for the bounced light hitting the surface is calculated. With the blurring added in the first pass, at 1210, both the selected point and nearby areas are illuminated.

Turning to FIG. 13B, the point sampled approximation of FIG. 13A can be improved if the area of the bounce map that gets reflected to the surface is used. As shown in FIG. 13B, this area is determined by calculating an approximate cone intersection with the ground plane. By using the distance that the ray hits the ground plane to calculate the radius of the cone, an approximation of the area of the intersection at that point can be calculated. This circular area of intersection can be converted to an approximate box. Using the mipmaps generated during the first pass at 1210, the level that overlaps this box the closest can be sampled. Sampling the bounce map with a given mip level can be supported in hardware for efficiency. Because a cone approximation to find the area of intersection is used, surfaces close to the ground plane get a sharper result than surfaces farther from the ground plane, thereby mimicking life-like surfaces.

In an even further embodiment, the single area sample of FIG. 13B can be improved by using multiple samples, such as shown in FIG. 13C. The direction of each of the samples is determined by importance sampling, such that each sample is distributed due to a cosine distribution. For example, see Physically Based Rendering: From Theory to Implementation, Third Edition, by Matt Pharr, Wenzel Jakob, and Greg Humphreys, Morgan Kaufmann, copyright 2010, which is hereby incorporated by reference in its entirety and for all purposes. For efficiency, these sample directions can be predetermined and stored in a table. Each sample direction can be transformed into the co-ordinate space of the normal. This sample direction can be used as the surfaces normal and the computation continues as discussed above for the single sample version. Finally, all the results can be averaged to get a more accurate result.

Figure 14A:
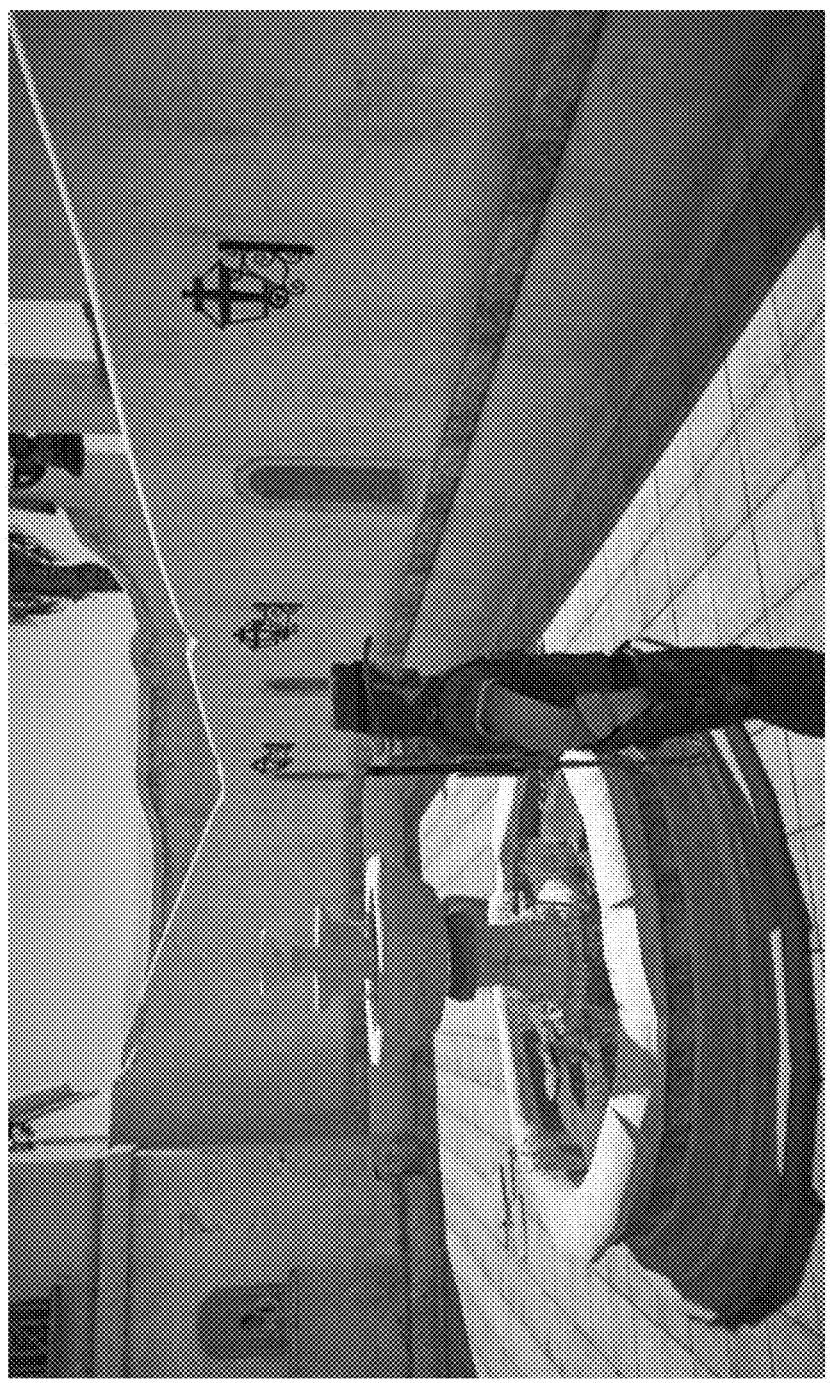
FIG. 14A is an exemplary screenshot illustrating a video game scene that does not use the global illumination process of FIGS. 12A-B.
Figure 14B:
FIG. 14B is an exemplary screenshot illustrating the video game scene of FIG. 14A that uses the global illumination process of FIGS. 12A-B.
Figure 15A:
FIG. 15A is an exemplary screenshot illustrating another video game scene without using the global illumination process of FIGS. 12A-B.
Figure 15B:
FIG. 15B is an exemplary screenshot illustrating the video game scene of FIG. 15A that includes the global illumination process of FIGS. 12A-B.

FIGS. 14B and 15B illustrate screenshots that have been illuminated using the processes described herein. For example, as shown in FIG. 14B, additional lighting via bounce light illumination can be found on the character, fountain, and to the wall on the right. The screenshot in FIGS. 14B and 15B can be contrasted with those in FIGS. 14A and 15A that illustrates the same scene without the bounce light illumination disclosed herein.

Figure 16A:
FIG. 16A is an exemplary screenshot illustrating another video game scene without using the global illumination process of FIGS. 12A-B.
Figure 16B:
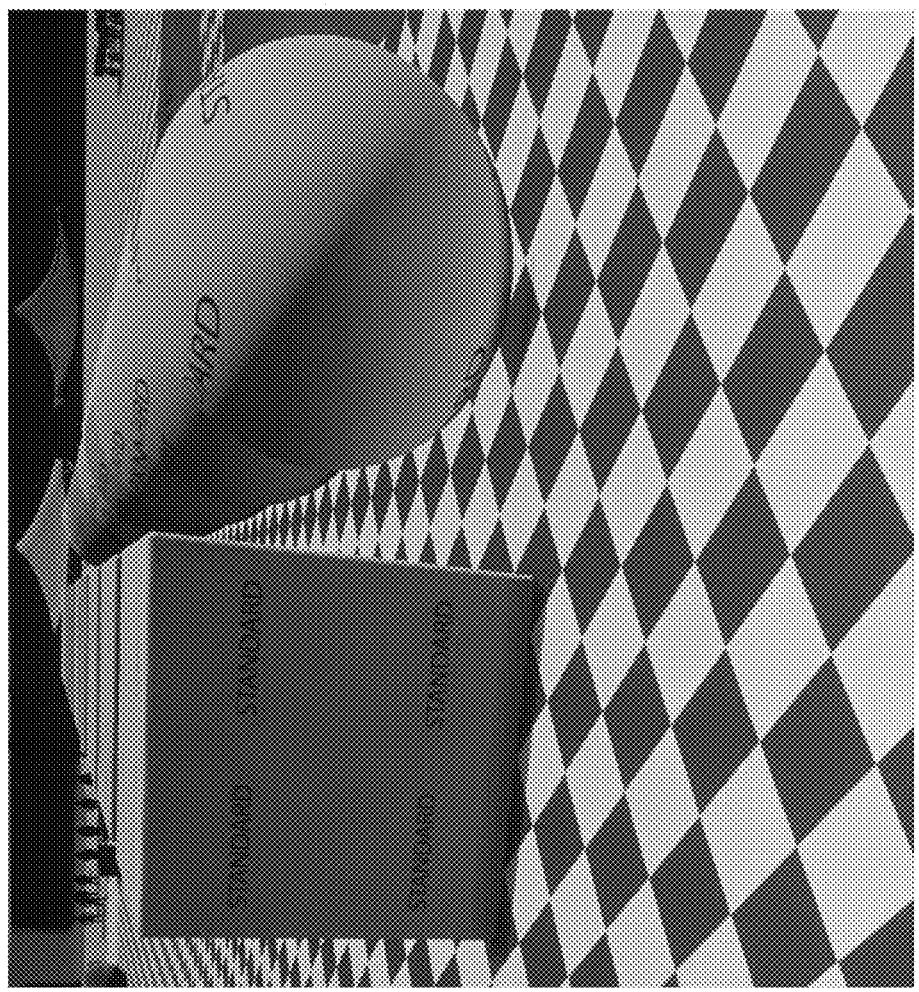
FIG. 16B is an exemplary screenshot illustrating the video game scene of FIG. 16A that includes the global illumination process of FIGS. 12A-B.
Figure 16C:
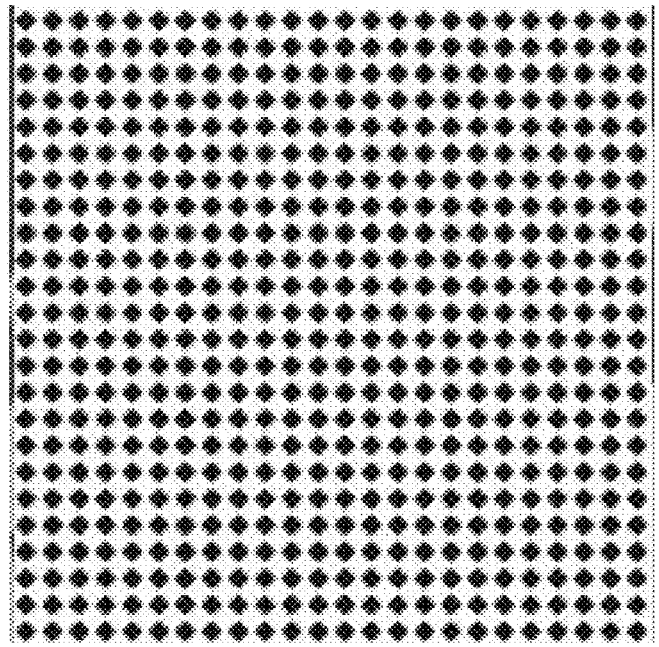
FIG. 16C is an exemplary diagram illustrating an embodiment of the bounce map for the scene shown in FIGS. 16A-B.
Figure 16D:
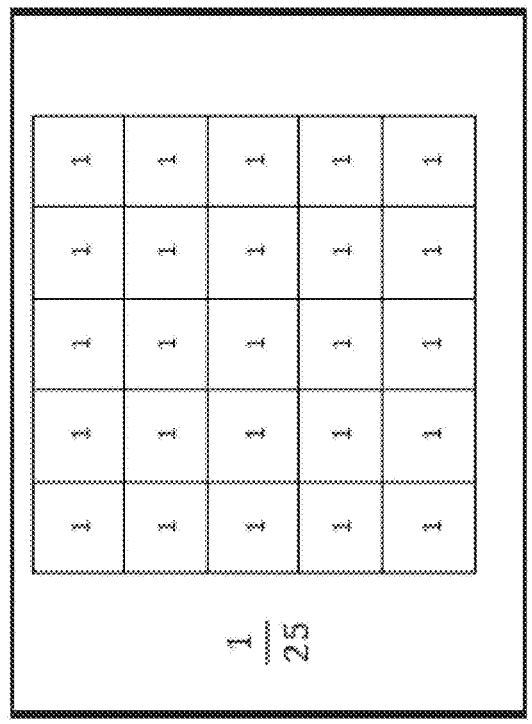
FIG. 16D is an exemplary diagram illustrating an embodiment of the box blur filter that can be applied to the bounce map of FIG. 16C.

FIGS. 16A and 16B similarly illustrate an exemplary scene without and with bounce light illumination, respectively. The texture map (or the "bounce map") is generated by rendering the scene in FIG. 16A-B lit by the sunlight with the camera above the scene and facing downwards. A bounce map 1601 for this scene is shown in FIG. 16C. An exemplary box blur filter 1602 for this scene is shown in FIG. 16D. After the box blur filter 1602 has been applied to the bounce map 1601, the light is spread across the surface, such as shown in FIG. 16E. As shown in FIG. 16E, the edges can be blended to black to show the map fade.

Figure 17A:
FIG. 17A is an exemplary screenshot illustrating a video game scene using a bounce map.
Figure 17B:
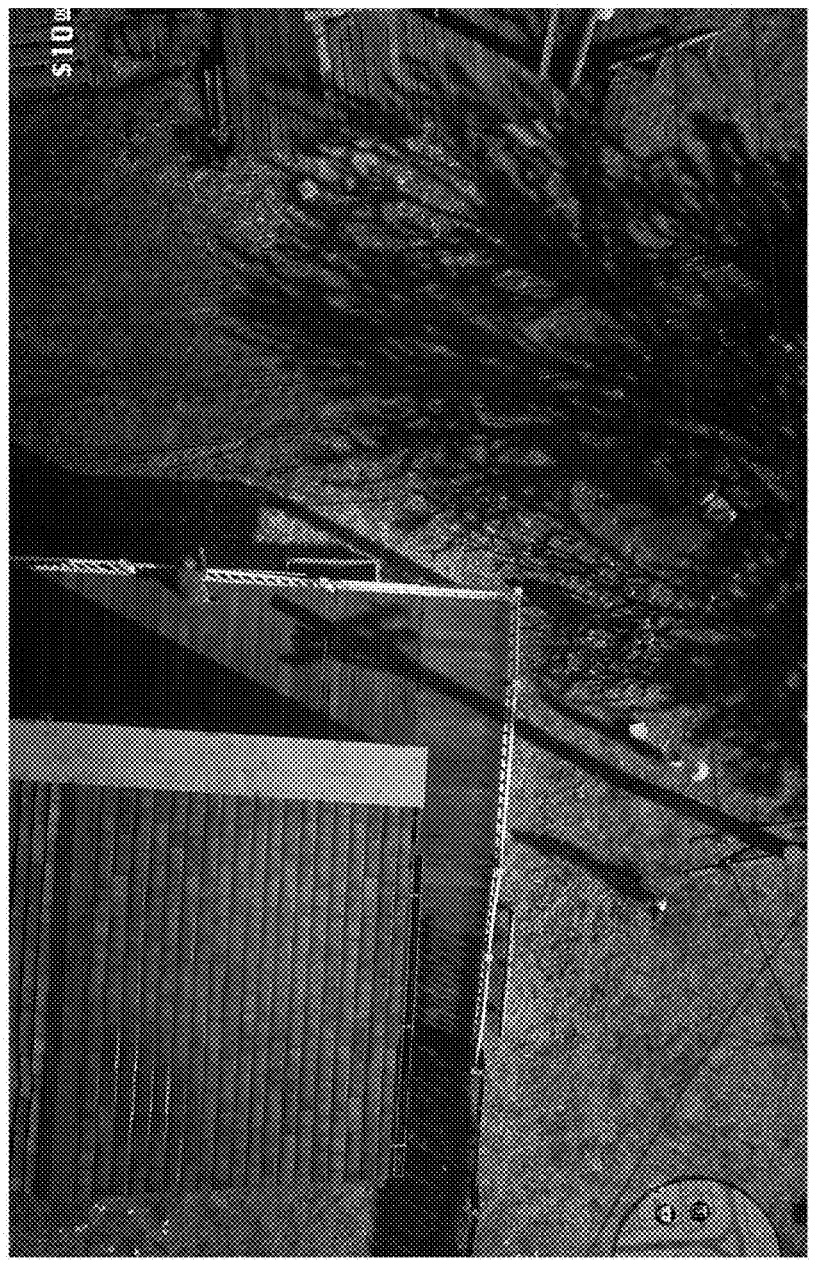
FIG. 17B is an exemplary screenshot illustrating a top-down view of the video game scene of FIG. 17A used for the bounce map.
Figure 18A:
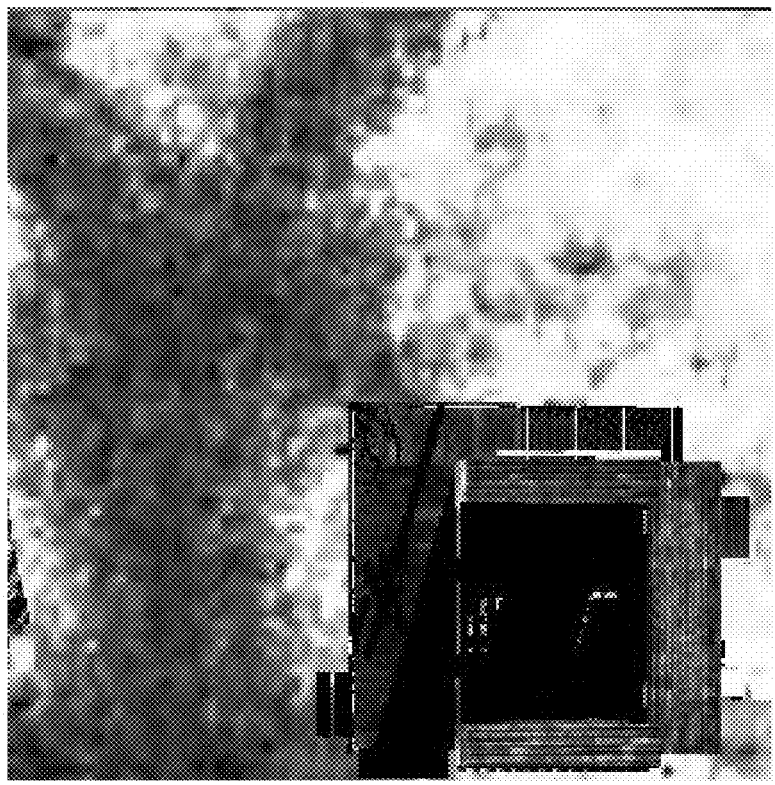
FIG. 18A is an exemplary diagram illustrating an embodiment of the bounce map generated from the scene of FIG. 17A.
Figure 18B:
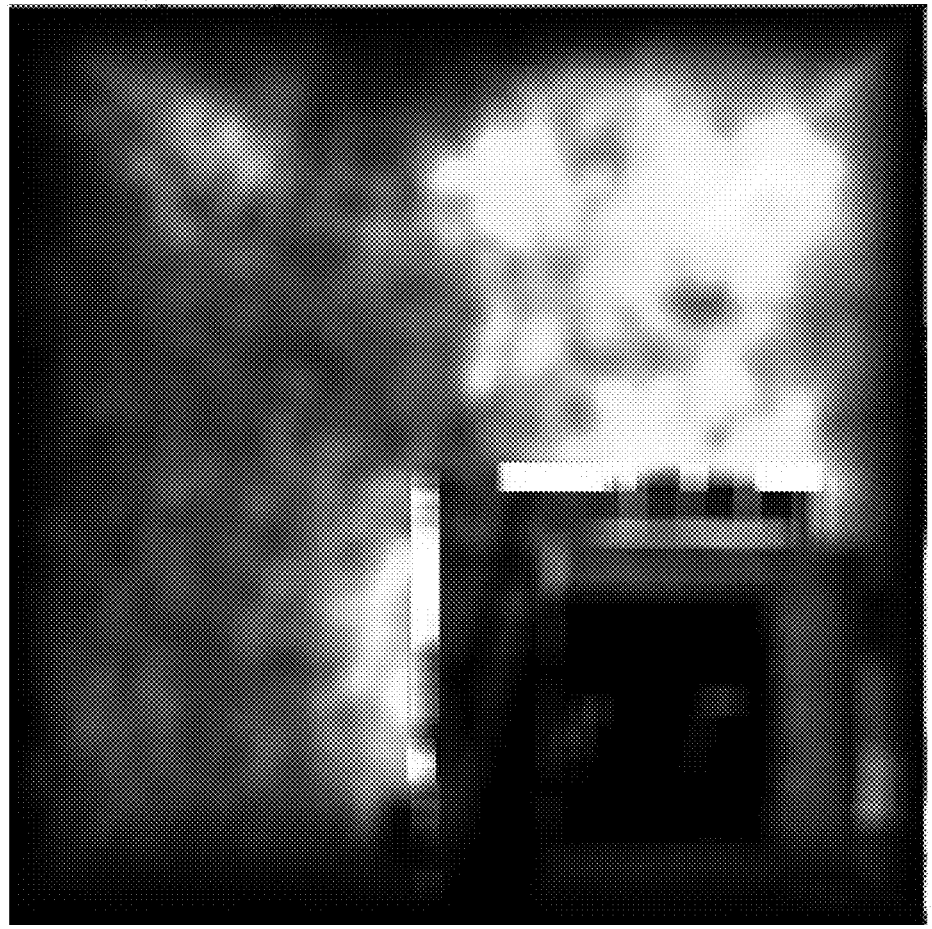
FIG. 18B is an exemplary diagram illustrating an embodiment of the bounce map of FIG. 18A that has been blurred at a location.
Figure 18C:
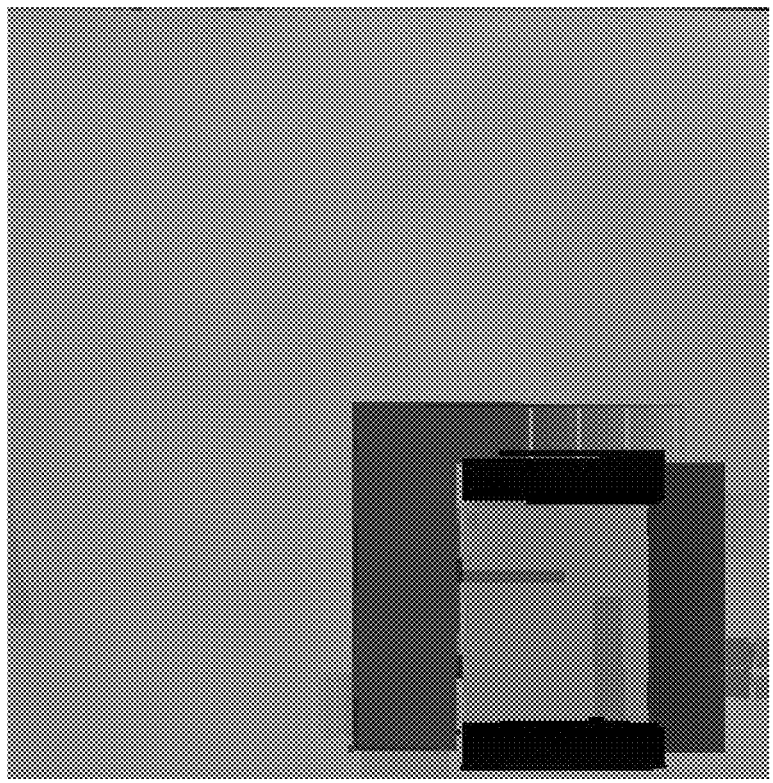
FIG. 18C is an exemplary depth map for the bounce map of FIG. 18B.

As yet another example, FIG. 17A illustrates an exemplary scene that has been rendered using a bounce map. In order to generate the bounce map, a top-down view of the scene of FIG. 17A is shown in FIG. 17B. Based on the top-down view, a bounce map, such as shown in FIG. 18A, can be generated. The bounce map of FIG. 18A is blurred in FIG. 18B in order to generate the depth map, shown in FIG. 18C.

Exemplary shader code for implementing bounce lighting is found below: Sample Shader Code for single sample

```
float3 CalculateBounceLookup(float3 worldPos, float3 normal) {
    // cull if normal is facing upwards, careful with threshold as can create seam
    if (normal.z>0.7) return 0.0;
    // Find the ground height
    float2 uvPos=mul(float4(worldPos.xyz+normal*0.5, 1.0f), GIViewProjMtx).xy;
    uvPos.y=1.0−uvPos.y;
```

```
float groundHeight=GetGroundHeight(uvPos);
// Take a sample along the bounce normal
float3 col=0.; // Gather additional samples using impor-
    tance sampling
float3 sampleDir=BendNormalDownwards(normal);
if (sampleDir.z<0.0){
    float t=abs((worldPos.z−groundHeight)/sampleDir.z);
        // use larger mips on worldPos.z
    col+=SingleRayBounce(worldPos, sampleDir, t)*abs
        (sampleDir.z);}
}
return col
}
```

Material Tinting

The present disclosure provides systems and methods for creating several in game object variants from a single model.

Figure 19:
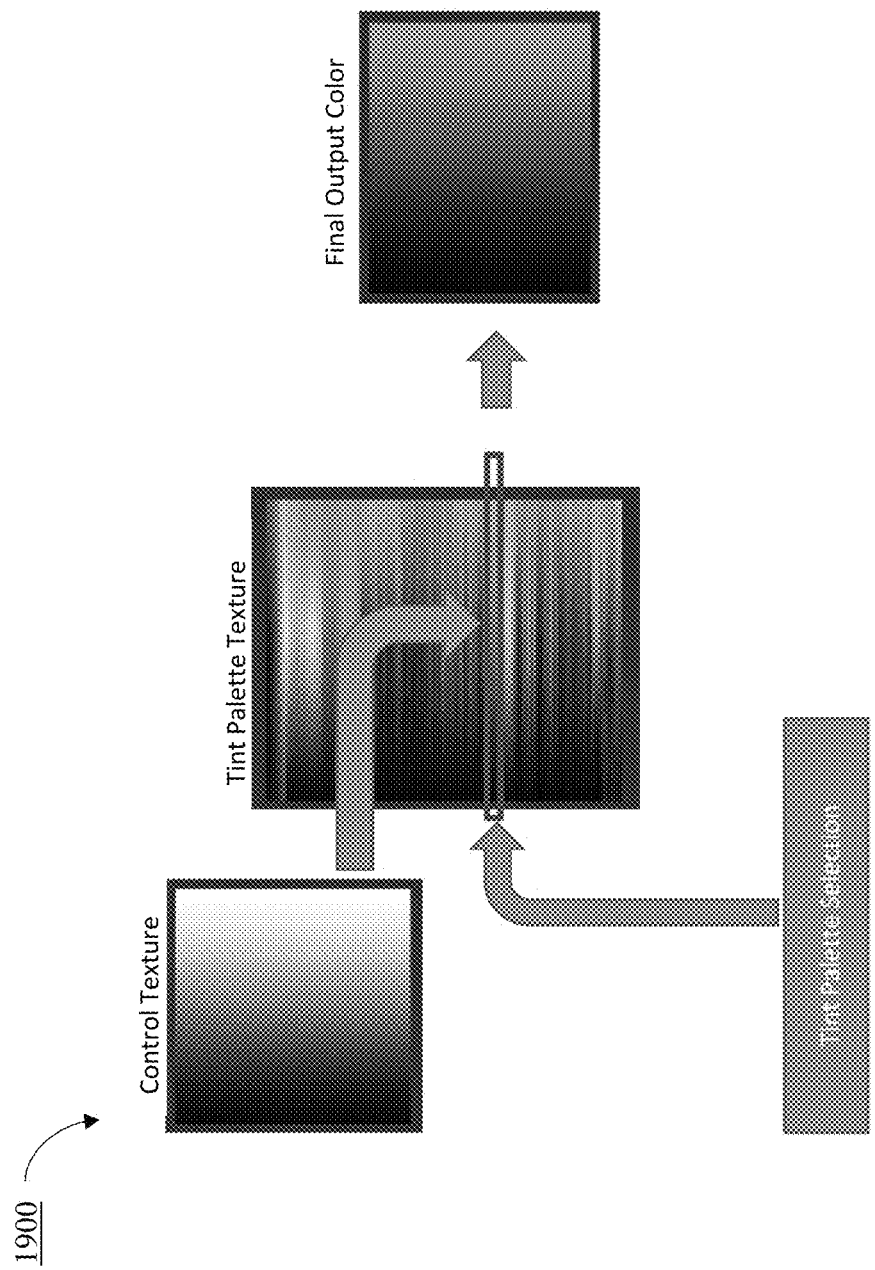
FIG. 19 is an exemplary top-level flow diagram illustrating one embodiment of a per pixel material tinting process that can be used with the vertex color tinting process of FIG. 1B.
Figure 20:
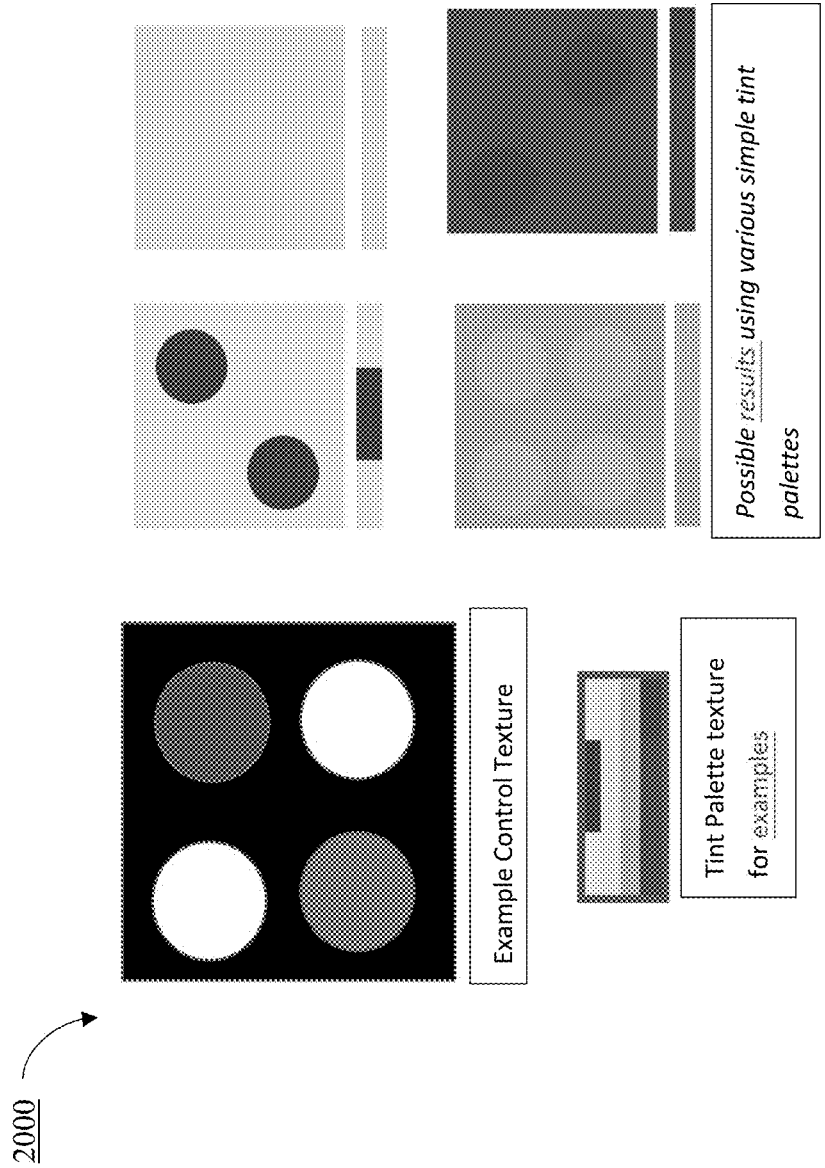
FIG. 20 is an exemplary diagram illustrating exemplary control textures and results using the per pixel material tinting process of FIG. 19.

Conventionally, per-vertex tinting is limited to changing the tint selection at a three-vertex position on a triangle. Additionally and/or alternatively to vertex material tinting, per-pixel tinting can be used, such as shown in FIG. 19. Per-pixel tinting enables control textures to remove the limitations of conventional per vertex tinting and allows for changing the tint within a triangle on a given model. This can greatly improve the quality of the result and have more flexibility with how the tint is applied. In some embodiments, per-pixel tinting includes the same tint palette texture and tint palette selection as vertex material tinting, but the control value can be read from a control texture in the pixel shader. This allows for a greater variation across the surface and the ability to change patterns and create unique patterns. This allows for greater detail, improved variation and finer control, such as shown in FIG. 20.

An added benefit is that by changing control textures, multiple variations can be included. Depending on the object, multiple layers of per-pixel material tinting can be used by using multiple channels in the control texture or multiple control textures.

Furthermore to add more variations, the per-pixel palettes now not only modifies an object colors but other material properties, such as metalness, lighting parameters, or additional layers such as mud, snow or dust.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

The invention claimed is:

1. A method for graphics rendering global illumination in a gaming environment, the method comprising:
    generating a texture map storing reflected light of a video game scene in the gaming environment, each texel of the generated map storing a reflected color as a red/green/blue triplet;
    determining a height of a terrain at a selected point by generating a depth map storing the height of each texel at the same resolution as the generated texture map;
    determining a bounced light per pixel from a ground of the gaming environment based on the generated texture map; and
    sampling the generated texture map for access lighting.

2. The method of claim 1, wherein said generating the texture map comprises rendering the video game scene having a light directly above the scene and facing downwards.

3. The method of claim 1, further comprising applying a box blur filter to the generated texture map, wherein each texel of the generated map becomes an average of its surrounding neighborhood of pixels.

4. The method of claim 1, wherein said sampling the generated texture map comprises bending a surface normal of a selected pixel towards a ground plane and determining an intersection of the bent surface normal with the ground plane.

* * * * *